US012769708B2

(12) United States Patent
Biyyapu et al.

(10) Patent No.: US 12,769,708 B2
(45) Date of Patent: Oct. 20, 2026

(54) SELECTING A NETWORK FILE SYSTEM (NFSV3) NODE IN A CLUSTER AS A FAILOVER IN A SCALE OUT DATA PROTECTION APPLIANCE

(71) Applicant: Dell Products L.P., Round Rock, TX (US)

(72) Inventors: Sai Sandeep Biyyapu, Pleasanton, CA (US); Ajey Godbole, Pune (IN); Poornima Gupte, Pune (IN); Shubham Datta Gaikwad, Nashik (IN); Vikas Chaudhary, Pune (IN); Donna Barry Lewis, Holly Springs, NC (US); George Matthew, Belmont, CA (US)

(73) Assignee: Dell Products L.P., Round Rock, TX (US)

( * ) Notice: Subject to any disclaimer, the term of this patent is extended or adjusted under 35 U.S.C. 154(b) by 4 days.

(21) Appl. No.: 18/990,424

(22) Filed: Dec. 20, 2024

(65) Prior Publication Data

US 2026/0178547 A1 Jun. 25, 2026

(51) Int. Cl.

| | |
|---|---|
| ***G06F 16/182*** | (2019.01) |
| ***G06F 11/20*** | (2006.01) |
| ***G06F 16/188*** | (2019.01) |
| ***H04L 61/5007*** | (2022.01) |
| ***H04L 67/1097*** | (2022.01) |

(52) U.S. Cl.

CPC ........ *G06F 16/182* (2019.01); *G06F 11/2002* (2013.01); *G06F 16/188* (2019.01); *H04L 61/5007* (2022.05); *H04L 67/1097* (2013.01)

(58) Field of Classification Search

CPC .......................... G06F 11/2023; G06F 11/2033

See application file for complete search history.

(56) References Cited

U.S. PATENT DOCUMENTS

| | | | | |
|---|---|---|---|---|
| 7,124,171 B1 * | 10/2006 | McCann | ............. | H04L 61/5061 709/216 |
| 7,937,453 B1 * | 5/2011 | Hayden | ................. | G06F 16/183 707/625 |

(Continued)

FOREIGN PATENT DOCUMENTS

WO WO-2014058944 A1 * 4/2014 ......... H04L 67/1008

OTHER PUBLICATIONS

Callaghan, B., Pawlowski, B., "NFS Version 3 Protocol Specification," Sun Microsystems, Inc. Jun. 1995. (Year: 1995).*

*Primary Examiner* — Ashish Thomas
*Assistant Examiner* — Catherine Marie Nguyen
(74) *Attorney, Agent, or Firm* — Staniford Tomita LLP

(57) ABSTRACT

An NFS export is created on a node of a data protection appliance. The export includes a backup to be accessed by an access object service hosted by the node. The node is in a cluster of nodes including other AOB services and NFSv3 servers accessible via external IP addresses. Each AOB service has access to other portions of the filesystem assigned to other AOB services. The export is mounted at an NFSv3 client which conducts data protection IO on the export using an external IP address to the node. A mapping of the export is maintained. Upon a node failure, resource utilization of other nodes is probed to select a failover node. The mapping is consulted to identify the IP address associated with the failed node. The IP address is migrated to the failover node.

15 Claims, 13 Drawing Sheets

(56) References Cited

U.S. PATENT DOCUMENTS

| | | | | |
|---|---|---|---|---|
| 11,734,301 | B1 * | 8/2023 | Cseri | G06F 16/273<br>707/639 |
| 11,916,740 | B2 * | 2/2024 | Chen | H04L 41/0893 |
| 2010/0057844 | A1 * | 3/2010 | Johnson | G06F 3/067<br>726/3 |
| 2011/0078467 | A1 * | 3/2011 | Hildebrand | G06F 9/5027<br>709/224 |
| 2014/0047263 | A1 * | 2/2014 | Coatney | G06F 11/2092<br>711/119 |
| 2017/0220432 | A1 * | 8/2017 | Misra | G06F 11/2092 |
| 2019/0340167 | A1 * | 11/2019 | Raman | H04L 47/72 |
| 2021/0357246 | A1 * | 11/2021 | Kumar | G06F 3/067 |
| 2022/0308925 | A1 * | 9/2022 | Shilane | G06F 16/162 |

* cited by examiner

| Category | Threshold for Weights for the NFSv3 server | | |
|---|---|---|---|
| | NFSv3-Server-1 | NFSv3-Server-2 | NFSv3-Server-3 |
| stream-weight | NFSv3-Server-1-TW1 | NFSv3-Server-2-TW1 | NFSv3-Server-3-TW1 |
| cpu-memory-weight | NFSv3-Server-1-TW2 | NFSv3-Server-2-TW2 | NFSv3-Server-3-TW2 |
| connections-weight | NFSv3-Server-1-TW3 | NFSv3-Server-2-TW3 | NFSv3-Server-3-TW3 |
| historical-workload-weight | NFSv3-Server-1-TW4 | NFSv3-Server-2-TW4 | NFSv3-Server-3-TW4 |

FIG. 6

Periodic probe fetches NFSv3 server's Connection count. The probe will set this weight to low if observed value is higher than threshold and will set the weight to high if observed value is lower than threshold

| NFSv3 Server | stream-weights |
|---|---|
| NFSv3-Server-1 | High |
| NFSv3-Server-2 | Low |
| NFSv3-Server-3 | Low |

FIG. 7

Periodic probe fetches NFS Server's current CPU and Memory utilization. The probe will set this weight to low if observed value is higher than threshold and will set the weight to high if observed value is lower than threshold

| NFSv3 Server | cpu-memory-weights |
|---|---|
| NFSv3-Server-1 | Low |
| NFSv3-Server-2 | Low |
| NFSv3-Server-3 | High |

FIG. 8

Periodic probe fetches total number of connections currently served by NFSv3 Server. The probe will set this weight to low if observed value is higher than threshold and will set the weight to high if observed value is lower than threshold

| NFSv3 Server | connections-weights |
|---|---|
| NFSv3-Server-1 | High |
| NFSv3-Server-2 | Low |
| NFSv3-Server-3 | Low |

FIG. 9

Periodic probe fetches the historical workload served by NFSv3 Server. The probe will set this weight to low If observed value is higher than threshold and will set the weight to high if observed value is lower than threshold

| NFSv3 Server | Historical-workload-weights |
|---|---|
| NFSv3-Server-1 | Low |
| NFSv3-Server-2 | Low |
| NFSv3-Server-3 | Low |

FIG. 10

| NFSv3 Server | Failover-weight |
|---|---|
| NFSv3-Server-1 | Low |
| NFSv3-Server-2 | Low |
| NFSv3-Server-3 | High |

FIG. 11

| NFSv3 Server | nfs_server_weights_ranking (check weights of each NFS's weight category) |
|---|---|
| NFSv3-Server-1 | High, Low, High, Low => High |
| NFSv3-Server-2 | Low, Low, Low, Low => Low |
| NFSv3-Server-3 | Low, High, Low, Low => Low |

FIG. 12

SELECTING A NETWORK FILE SYSTEM (NFSV3) NODE IN A CLUSTER AS A FAILOVER IN A SCALE OUT DATA PROTECTION APPLIANCE

TECHNICAL FIELD

The present invention relates generally to information processing systems, and more particularly to data protection systems.

BACKGROUND

A virtual machine (VM) is a software-based emulation of a physical computer that runs an operating system (OS) and applications just like a physical machine. It operates within a host system and uses virtualization technology to share the host's hardware resources, such as CPU, memory, and storage. A VM can be created and managed through a hypervisor. The hypervisor is a software layer that handles the allocation and management of resources between the host and the VM.

An enterprise may have many hundreds or even thousands of virtual machines processing data and providing services. Enterprises rely heavily on data for operations, decision-making, and customer interactions. Losing that data could result in significant financial, legal, and operational consequences. Backing up virtual machines is an essential part of data protection and disaster recovery in virtualized environments. The backup process for VMs involves capturing the state, data, and configuration of the entire VM so it can be restored in case of hardware failures, corruption, or accidental deletion.

The process to restore virtual machine data from a backup generally involves moving a backup copy from a backup data store to a production environment. Depending, however, on the size of the backup, network bandwidth, available compute resources, and other factors, the time to transfer the data can take several minutes, hours, or even more. There is a need to reduce the recovery time. Problems during the recovery process can require restarting the entire operation from the beginning.

There is a need for improved systems and techniques for recovering backups and handling problems that may occur during the recovery process.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY

A Network File System (NFS) export is created on a node of a data protection appliance. The NFS export includes a backup to be accessed by an access object (AOB) service hosted by the node. The node is part of a cluster of nodes including other AOB services and NFSv3 servers accessible via external Internet Protocol (IP) addresses. The AOB services are responsible for handling different portions of a deduplication file system of the appliance within which backups are organized. Each AOB service still has access to other portions of the file system assigned to other AOB services. The NFS export is mounted at an NFSv3 client. The client is allowed to conduct data protection input/output (IO) on the NFS export using an external IP address associated with the node. A mapping of the NFS export and the IP address associated with the node is maintained. Upon a failure of the node, resource utilization of other available nodes in the cluster is probed to select a failover node. The mapping is consulted to identify the external IP address associated with the failed node. The IP address is migrated from the failed node to the failover node thereby allowing requests for the data protection IO on the NFS export by the client to continue using the IP address previously associated with the failed node.

BRIEF DESCRIPTION OF THE FIGURES

In the following drawings like reference numerals designate like structural elements. Although the figures depict various examples, the one or more embodiments and implementations described herein are not limited to the examples depicted in the figures.

FIG. 6 shows a table of calculated threshold weights for various weight categories associated with the servers, according to one or more embodiments.

FIG. 7 shows a table of stream-weights set on the servers, according to one or more embodiments.

FIG. 8 shows a table of CPU/memory weights set on the servers, according to one or more embodiments.

FIG. 9 shows a table of connection weights set on the servers, according to one or more embodiments.

FIG. 10 shows a table of historical workload weights set on the servers, according to one or more embodiments.

FIG. 11 shows a table of failover-weights set on the servers, according to one or more embodiments.

FIG. 12 shows a table counting the weights set on the servers, according to one or more embodiments.

DETAILED DESCRIPTION

Figure 1:
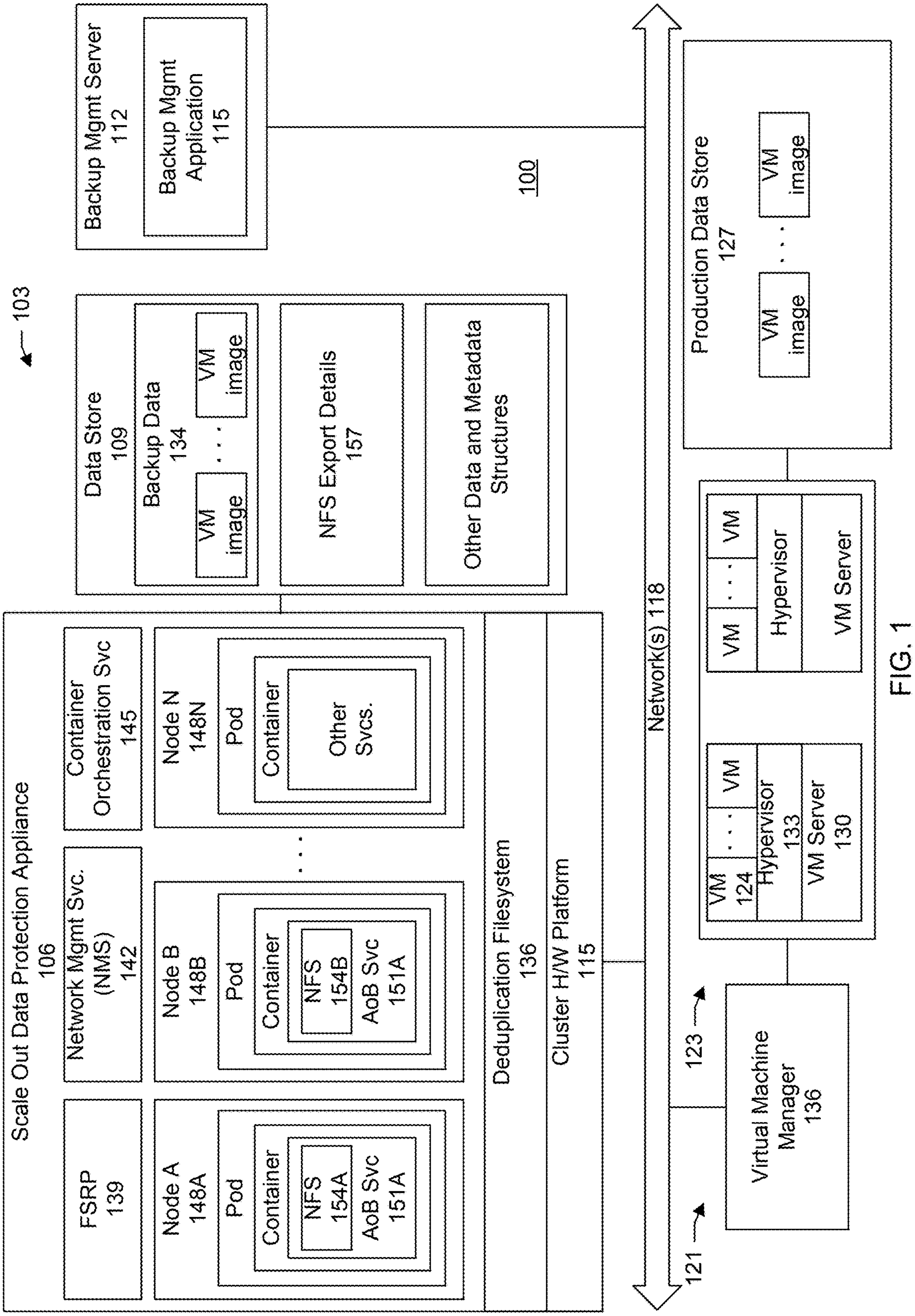
FIG. 1 shows a block diagram of an information processing system for selecting a failover node, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network. In this disclosure, the variable N and other similar index variables are assumed to be arbitrary positive integers greater than or equal to two. It should be appreciated that the blocks shown in the figures may be functional and there can be many different hardware and software configurations to implement the functions described.

FIG. 1 shows a block diagram of a system 100 within which methods and systems for selecting a node of a cluster as a failover node for data protection input/output (IO) operations may be implemented. An information processing system 103 includes a scale-out data protection appliance 106, data store 109, and backup management server 112 with backup application 115. The components of the information processing system, such as the data protection appliance, are supported by an underlying hardware platform. The hardware platform may include memory and processors, among other hardware components.

A network 118 connects the data protection appliance to a production environment 121. The production environment includes assets 123 to be protected (e.g., backed up) by the data protection appliance. For example, the production environment may include virtual machines (VMs) 124 utilizing a production or primary data store 127 for data generated or used by the virtual machines.

Generally, virtualization is an abstraction layer that allows multiple virtual environments to run in isolation, side-by-side on the same physical machine. A virtual machine is a software implementation of a machine (e.g., a computer) that executes programs like a physical machine. In other words, the virtual machine is a software abstraction of a physical computer system that is installed as a "guest" on a "host" hardware platform. A computer running the hypervisor is a host machine and virtual machines are guest machines running guest operating systems (OS).

In the example shown in FIG. 1, a server 130 functions as a host and includes a hypervisor 133 that manages the underlying hardware resources. The hypervisor creates a virtual environment where each VM operates independently with its own operating system as if it were running on dedicated hardware. In an embodiment, the hypervisor is ESXi as provided by VMware of Palo Alto, California. ESXi is a type of hypervisor that may be referred to as a bare-metal hypervisor (as opposed to hosted hypervisor). Bare-metal hypervisors are installed directly on the physical hardware, with no underlying operating system. Bare-metal hypervisors can offer better performance than hosted hypervisors and are generally considered more secure due to direct access to hardware of the host platform. Thus, the hosts or servers may be referred to as VM servers, VM hosts, ESXi hosts, or ESXi servers.

In an embodiment, the production environment includes a virtual machine manager 136 that manages and monitors the multiple virtual machines and virtual machine hosts or servers. The virtual machine manager allows administrators to manage multiple virtual machine hosts and virtual machines from a centralized interface. A production data center may have thousands of virtual machines across hundreds of hosts. Communications from the virtual machine manager to the various virtual machines and hosts may be exchanged via a user interface (e.g., graphical user interface (GUI) or command line) or programmatically such as via an application programming interface (API).

Each virtual machine has a corresponding virtual disk image. The virtual disk image contains the virtual machine's virtual disk and configuration files. The virtual disk is a file that represents the storage for a virtual machine. It functions as the virtual machine's hard drive and thus contains virtual machine's operating system, applications, and data. An example of a virtual disk file format is VMDK (virtual machine disk) as provided by VMware. Virtual disk files may be created and managed by hypervisors, such as VMware ESXi. In an embodiment, a virtualization platform allows live migration of running VMs between different hosts and migration of a VM's virtual disks between storage systems. An example of a virtual machine manager is vCenter as provided by VMware.

The data protection appliance is responsible for backing up assets in the production environment and managing the backups. The assets may include virtual machines, databases, filesystems, files, objects, directories, or any other unit of data. In an embodiment, the backup management application issues a request to the data protection appliance to conduct a backup. The request may be issued on-demand, such as by an administrator user, or automatically as part of an on-going backup schedule or backup policy previously configured by the administrator user. Alternatively, the administrator may use the backup management application to issue a request to the data protection appliance to restore a backup. Backup data 134 stored in the data store of the data protection appliance may include backup copies of the virtual machine images, among other data. The backups are secondary copies and may be stored in a format that is different from a native format from which they were created. For example, backup copies may be stored in a compressed format, deduplicated format, or both.

The data protection appliance is designed to scale and handle large volumes of data and files while reducing backup storage requirements through deduplication and compression techniques. In an embodiment, the data protection appliance includes a set of components or services including a distributed deduplication filesystem 136, filesystem redirector and proxy service (FSRP) 139, network management service (NMS) 142, container orchestration service 145, and nodes 148A-N. The nodes form a cluster and host services and other components of the filesystem. Such services and components may include access object (AOB) services 151A-N and Network File System version 3 (NFSv3) servers 154A-N, among other components.

The filesystem provides a way to organize data stored in a storage system and present that data to clients and applications in a logical format. The filesystem organizes the data into files and folders into which the files may be stored. When a client requests access to a file, the filesystem issues a file handle or other identifier for the file to the client. The client can use the file handle or other identifier in subsequent operations involving the file. The namespace of the filesystem provides a hierarchical organizational structure for identifying filesystem objects through a file path. A file can be identified by its path through a structure of folders and subfolders in the filesystem. A filesystem may hold many hundreds of thousands or even many millions of files across many different folders and subfolders and spanning thousands of terabytes.

In an embodiment, filesystem services are provided as microservices distributed across the nodes of the cluster. In other words, the filesystem is a distributed or clustered file system where different components of the filesystem coordinate to provide scalability, redundancy, load-balancing, and failover. The services are managed by the container orchestration service. An example of a container orchestration service is Kubernetes. Kubernetes is an open-source container-orchestration system for automating computer application deployment, scaling, and management. The data protection appliance may be referred to as a scale-out data protection appliance as filesystem services can be quickly scaled up or down based on demand.

A container is a virtualized computing environment that runs an application program as a service or, more specifically, microservice. Containers are similar to virtual machines (VMs). Unlike VMs, however, containers have relaxed isolation properties to share the operating system (OS) among the containerized application programs. Containers are thus considered lightweight. Containers can be portable across hardware platforms including clouds because they are decoupled from the underlying infrastructure. Applications may be run by containers as microservices with the container orchestration service facilitating scaling and failover. For example, the container orchestration service can restart containers that fail, replace containers, kill containers that fail to respond to health checks, and withhold advertising them to clients until they are ready to serve.

In an embodiment, the filesystem services or microservices run inside the virtualized environment provided by the orchestration service as containers. One or more containers may be grouped into a group that may be referred to as a pod. Pods can run one or more containers that share the same network namespace, storage, and other resources. The filesystem services can run on one or multiple physical or virtual nodes. The filesystem can be run on premises with dedicated hardware or in a public cloud environment.

The access object services are responsible for handling namespace operations, building a tree structure for files to support random IO, and assigning data to other nodes that may be responsible for deduplication, compression, and writing data to and fetching data from the backup data store. In an embodiment, any AOB can handle namespace operations and file access, but different AOBs may be assigned responsibility for different portions of the filesystem or different ranges of files.

Based on a hash of a file handle, path, or other information associated with a file, the filesystem redirector and proxy service attempts to redirect or route associated data protection traffic to a particular access object service in a consistent manner so that future writes and/or reads of the same file are routed consistently to the same access object service. Consistent routing or redirection by FSRP enables the AOBs to cache state in memory that may be reused for other accesses. Consistent routing further helps to reduce locking, coordination, and collision issues among different AOBs because each AOB can operate on its assigned range of files independent of another AOB that may be assigned a different range of files. An AOB attempts to keep necessary state in memory for efficiency. The state, however, is globally available and can be handled by other AOB instances in case of an instance failure. The files or, more particularly, file handle hash ranges can be dynamically reassigned to the AOBs to maintain a balance across currently available AOBs.

The network manager service communicates with the container orchestration service to monitor the cluster including cluster membership and, more particularly, identifications of AOB instances or nodes that are currently active or available in the cluster and AOB instances or nodes that have failed. More particularly, when a node or other service or component hosted by the node has failed, the network manager service is responsible for mitigating the impact of the failure by selecting a different node that is available as a failover node to handle the workloads or operations of the failed node. When the failed node is eventually recovered, the network manager service is responsible for failing back the workloads and operations to the now recovered node.

NFSv3 server is a server that uses version 3 of the Network File System protocol to share files and directories over a network. This allows clients to access and interact with the server's filesystem as if it were a local storage drive. The process of sharing files and directories is referred to as an export. Creating an export refers to the process of sharing a directory or file over a network using the NFS protocol, thereby allowing other remote computers (e.g., clients) to use that directory as if it were part of their own local filesystem. Computers or devices running an NFSv3 client can mount these exported directories which makes them accessible like local filesystems. A particular computer system may act as both a client or a server depending on whether the computer system is requesting or providing information.

In an embodiment, the network management service stores or persists details associated with NFS exports 157. The network management service is responsible for mapping the external IP addresses of the NFS exports and access object services. These NFS export details are saved to persistent storage and are used by the network manager service to facilitate recovery, failover, and failback during certain restoration workflows. Details about an NFS export may include, for example, an IP address through which the NFS export can be accessed or reached, client at which the NFS export has been mounted, a node, AOB service, or NFSv3 server associated with or assigned the IP address, other NFS export session information, or combinations of these. The network management service tracks the migrations or assignments of the IP addresses to the access object services throughout the failover and failback processes.

More particularly, in an embodiment, the data protection appliance provides an Instant Access (IA) and Instant Recovery (IR) workflow. This workflow involves booting a virtual machine directly from the data protection appliance to restore virtual machine images or individual files of the virtual machine in cases of disaster recovery in a virtualized environment. That is, the virtual machine image remains at the data protection appliance while being booted. This workflow allows for an extremely fast boot time as compared to a traditional restoration, where the virtual machine image is first transferred back to the production data store before boot and thus the boot time is dependent on the speed of restoration and size of the virtual machine image.

In an embodiment, the IA/IR workflow involves creating an NFS export on a node of the data protection appliance or, more specifically, a node having AOB instance and NFSv3 server. Thus, the node may be referred to as an NFSv3 server or AOB node. The data protection appliance presents the virtual machine files to the hypervisor (e.g., VMware ESXi) using NFS v3. In an embodiment, the data protection appliance provides the details concerning the virtual machine files to the virtual machine manager which in turn routes the details to the appropriate VM server. The presentation of the virtual machine files by the data protection appliance allows the hypervisor to access the virtual machine files as if they were on local storage.

Specifically, the data protection appliance creates an NFS data store that is mounted to the ESXi host. This NFS data store contains the virtual machine files from the backup image. The virtual machine is then registered on the ESXi host and can be powered on and run directly from this NFS data store that has been created by the data protection appliance.

In other words, the hypervisor (or client that may be referred to as an NFSv3 client) can mount this NFS data store and access the virtual machine files directly from the data protection appliance. The virtual machine can be powered on and run directly from this NFS-mounted data store, without first copying the entire virtual image from backup to production storage. The NFS export allows the NFSv3 client to read the virtual machine files as if they were on local storage, while the actual data remains on the backup appliance. This approach enables rapid recovery by eliminating the need to transfer large amounts of data before the virtual machine can be powered on.

The NFS data store is a temporary data store for temporary usage by the (VMware) compute infrastructure. An example of the temporary data store includes EMC vProxy. From the perspective of the NFSv3 client or ESXi host and the virtual machine itself, it appears as though the virtual machine is running from a normal production data store. However, all read operations are actually being served from the virtual machine backup image on the data protection appliance. Files within the virtual machine can be accessed and restored. The data protection appliance can conduct a live data store migration from the temporary data store to the production data store. Once the migration is complete, the temporary data store may be removed.

Problems can arise, however, if the node or server on which the NFS export was created crashes, fails, or otherwise becomes unavailable during the recovery because NFSv3 is not a clustered protocol. In such cases, files undergoing restoration may become corrupted, the user may have to restart the recovery process from the beginning, or both. In an embodiment, systems and techniques are provided to address these and other limitations of the NFSv3 protocol during recovery of a backup from a scale out data protection appliance.

In an embodiment, the components of the data protection appliance responsible for file system access include the NFS server, access object (AOB) service, and network management service. The NFS server provides access to protection storage on the cluster to NFS clients. The AOB nodes provide and manage the namespace access of the filesystem. The network management service provides movement of IP address in case of failures.

Systems and techniques are provided to select an NFSv3 server backend node which is not overloaded and to ensure that the NFS export information is available on the selected NFSv3 server backend node. More specifically, in an embodiment, the data protection appliance includes a scale-out data protection stack, built on a software defined microservices-based architecture. This stack can be deployed on a qualified Kubernetes (K8s) infrastructure running in an on-premises environment or in the public cloud. The NFS server is part of an access object (AOB) backend node. There is a single instance of an AOB running on each node of the scale-out data protection system where each AOB has a dedicated external IP address associated with it.

During an IA/IR workflow, an NFS export is created on one of the NFSv3 server/AOB backend nodes currently observed on the scale-out data protection appliance. The selection of the NFSv3 server backend node for the NFS export creation is based on a predefined criteria. This created NFS export is then mounted on the VMware ESXi Server data store before resuming with the IA or IR operation. During the entire duration of the IA or IR operation, the accessibility and availability of the mount point remains very important. The active IA or IR operations fails if the mount point is not accessible.

Since NFSv3 is not a clustered protocol, the NFS exports created on an NFSv3 server backend node are available only on that specific NFSv3 server backend node where they are created and are not visible to other NFSv3 server backend nodes. Hence, in a clustered environment with NFSv3 protocol it is not possible to fail over the NFSv3 servers unless the export details are available globally, e.g., across the available NFSv3 servers. The IP address of the NFSv3 server backend node needs to be valid upon the failure of the backend node as the NFS exports are mounted on the client using the IP address of the NFSv3 server backend node. The validity of the export mounts on the client post failure of the backend node helps to ensure that there is no impact to the ongoing data protection operations.

In an embodiment, upon the failure of the NFSv3 backend node, the IP address of the NFSv3 backend node is assigned, reassigned, or migrated to another available NFSv3 backend node such that the selected NFSv3 backend node has sufficient resources. The availability of the sufficient resources on the selected NFSv3 server backend node helps to ensure that the selected NFSv3 server backend node is not overloaded and thus there is minimal or relatively low performance impact to the ongoing data protection operations. The selected NFSv3 server backend node is made aware of the NFS export(s) created on the failed NFSv3 server backend node. The movement of the assigned NFSv3 server IP address helps to enable the mount on the client to continue working seamlessly. Further, after or post NFSv3 server or node failure, the new NFSv3 server is made aware about the existing NFS exports created on the failed or another NFSv3 servers.

In an embodiment, systems and techniques are provided to select an NFSv3 server backend node which is not overloaded and to ensure that the NFS export information is available on the selected NFSv3 server backend node. In an embodiment, an algorithm evaluates selection criteria of the NFSv3 server backend nodes to identify an NFSv3 server that satisfies the selection criteria and is not overloaded.

Upon detecting a failure of the NFSv3 server backend node, the external IP address is migrated to another NFSv3 server backend node with sufficient resources to not overload the selected NFSv3 server backend node. An algorithm considers all the NFSv3 server backend nodes currently available on the scale-out protection appliance. The appliance nodes can be heterogeneous ones where each node can contain processors or devices with different bandwidth and computational capabilities. For example, there can be some nodes in the scale-out appliance which can have twice power or more compared to the rest of the nodes.

An algorithm checks multiple weights, loadings, resource measurements or utilization metrics associated with a selected NFSv3 server backend node to understand or determine if the selected NFSv3 server backend node is currently not overloaded and can be used as a failover node (or is or may soon become overloaded and should thus be excluded from being a failover node). In an embodiment, if any or multiple weights are observed to be set as "low," the method considers the NFSv3 server backend node as overloaded and skips the same. The algorithm iterates through the rest of the NFSv3 server backend nodes to identify a node whose associated weights are observed to be "high" and thus not overloaded. Below is a listing of weights or criteria to identify if the NFSv3 server backend node is an overloaded service:

1) The total number of active file operations being serviced by the NFSv3 server backend node, e.g., availability of the read/write/replication streams on the NFSv3 server backend node.
2) CPU/memory/network/disk utilization of the NFSv3 server backend node.
3) Total number of DDBoost client requests currently served by the NFSv3 server backend node.
4) Current scale out protection appliance workload.
5) Historical workload served by the NFSv3 server backend node earlier at that time of the day/time of the week/month.
6) Whether the NFSv3 server backend node is currently serving as a failover for another or different failed NFSv3 server backend node.

In an embodiment, systems and techniques provide an awareness of the NFS export on all NFSv3 server backend nodes. More particularly, to ensure that the selected NFSv3 server backend node is aware of the NFS export(s) created on the other NFSv3 server backend node, systems and techniques help to ensure that the NFS export information is available and accessible from all the NFSv3 servers available on the cluster. This is done by persisting the NFS export information in the cluster. There are multiple options for persisting the NFS export information.

In an embodiment, the NFS export details are persisted in a global cluster wide registry provided by the data protection appliance. In another embodiment, the NFS export details are persisted in a central ConfigMap management service or component provided by the container orchestration platform.

These two options enable the NFS export information to be available on all the nodes in the cluster. The details of NFS export created or modified on a node are stored in each of the NFSv3 server's local in-memory exports cache. The export details are also persisted to the persistent storage. Whenever an NFSv3 server receives the I/O requests, NFSv3 server looks up its local in-memory export cache for the export details. If the export details are not found in the local in-memory export cache, NFSv3 server fetches the required export details from the persistent store. The export created or modified on an NFSv3 server on any node adds the export information to the persistent store enabling all the NFSv3 servers on all nodes to have access to the export details.

In an embodiment, a method includes: creating a Network File System (NFS) export on a node having an access object service and NFSv3 server of a data protection appliance, the NFS export being accessible by an external Internet Protocol (IP) address assigned to the node; persisting details about the NFS export to a storage system accessible by other nodes of the data protection appliance; allowing a client to mount the NFS export to conduct data protection input/output (IO) operations on the NFS export created at the node; upon the node becoming unavailable, migrating the external IP address of the node to another node of the data protection appliance, the other node being a failover node; tracking the migration of the external IP address; receiving, from the client and via the external IP address, a request at the failover node for a next data protection IO operation on the NFS export; checking a local in-memory export cache at the failover node for details about the NFS export; and upon determining that the cache does not have the details about the NFS export, fetching the details about the NFS export from the storage system, thereby allowing the next data protection IO operation to be fulfilled with the client using the same external IP address to access the NFS export as before the unavailability of the node.

Figure 2:
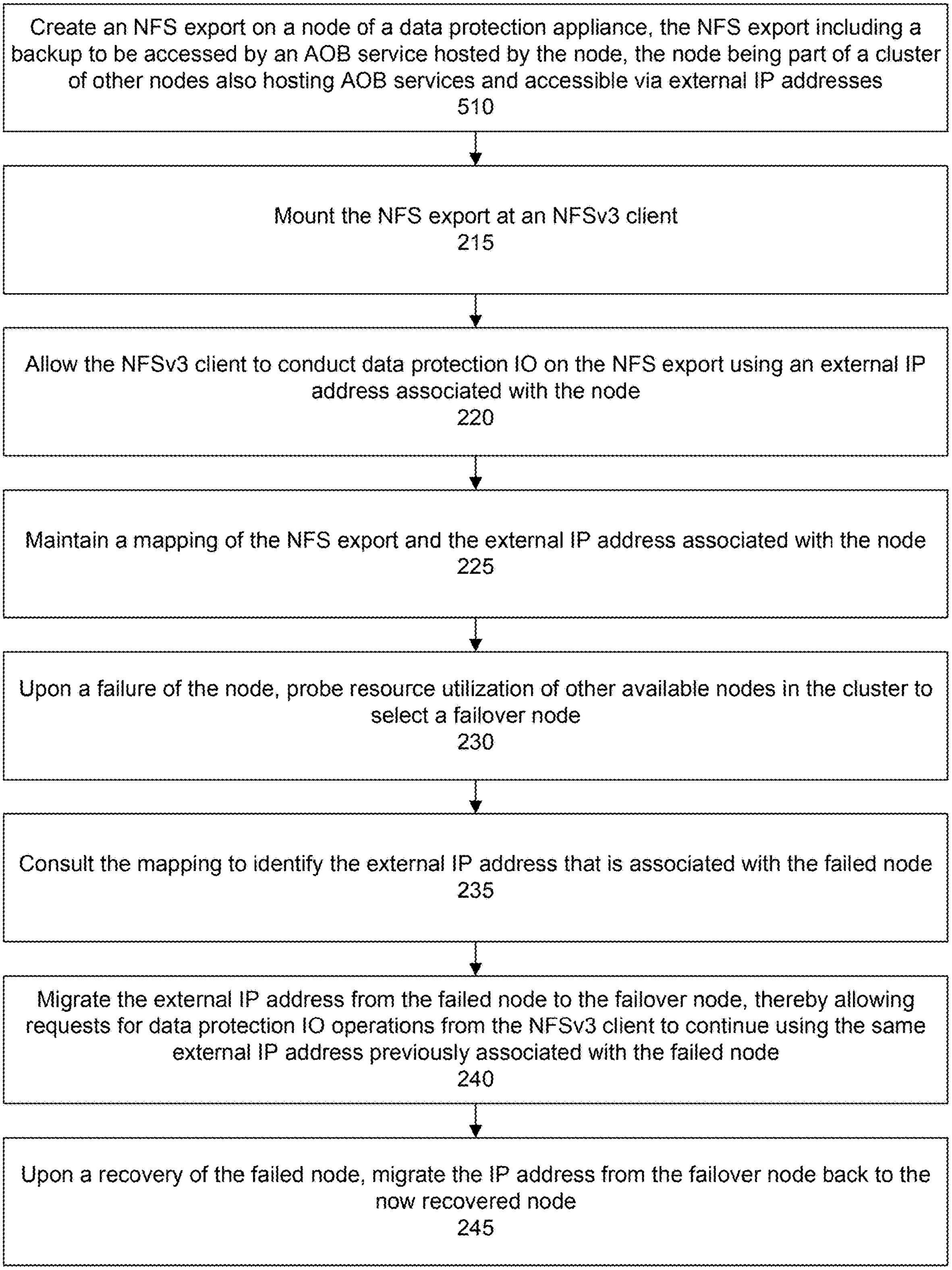
FIG. 2 shows a flow of the selection process, according to one or more embodiments.

FIG. 2 shows an overall flow for selecting an NFSv3 node in a scale out data protection appliance for failover. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In brief, in a step 210, an NFS export is created on a node of a data protection appliance, the NFS export including a backup to be accessed by an AOB service hosted by the node. The node is part of a cluster of other nodes also hosting other AOB service instances and that are accessible via external IP addresses. In a step 215, the NFS export is mounted at a client. The client may be referred to as NFSv3 client. In a step 220, the NFSv3 client is allowed to conduct data protection IO on the NFS export using an external IP address associated with the node.

In a step 225, details about the NFS export are maintained and stored to persistent storage. More particularly, a mapping is maintained of the NFS export and the external IP address associated with the node.

In a step 230, upon a failure of the node, resource utilization of or loads on other available nodes in the cluster is probed to select a failover node. In an embodiment, detecting the failure of the node triggers a probing or loading checks on the other available nodes of the cluster to select a node that is not overloaded to serve as the failover node.

In a step 235, the mapping is consulted to identify the external IP address that is associated with the failed node. In a step 240, the external IP address is migrated from the failed node to the failover node. This allows requests for data protection IO operations from the NFSv3 client to continue using the same external IP address previously associated with the failed node.

In a step 245, upon recovery of the failed node, the IP address is migrated from the failover node back to the now recovered node. This process may be referred to as a failback.

Figure 3:
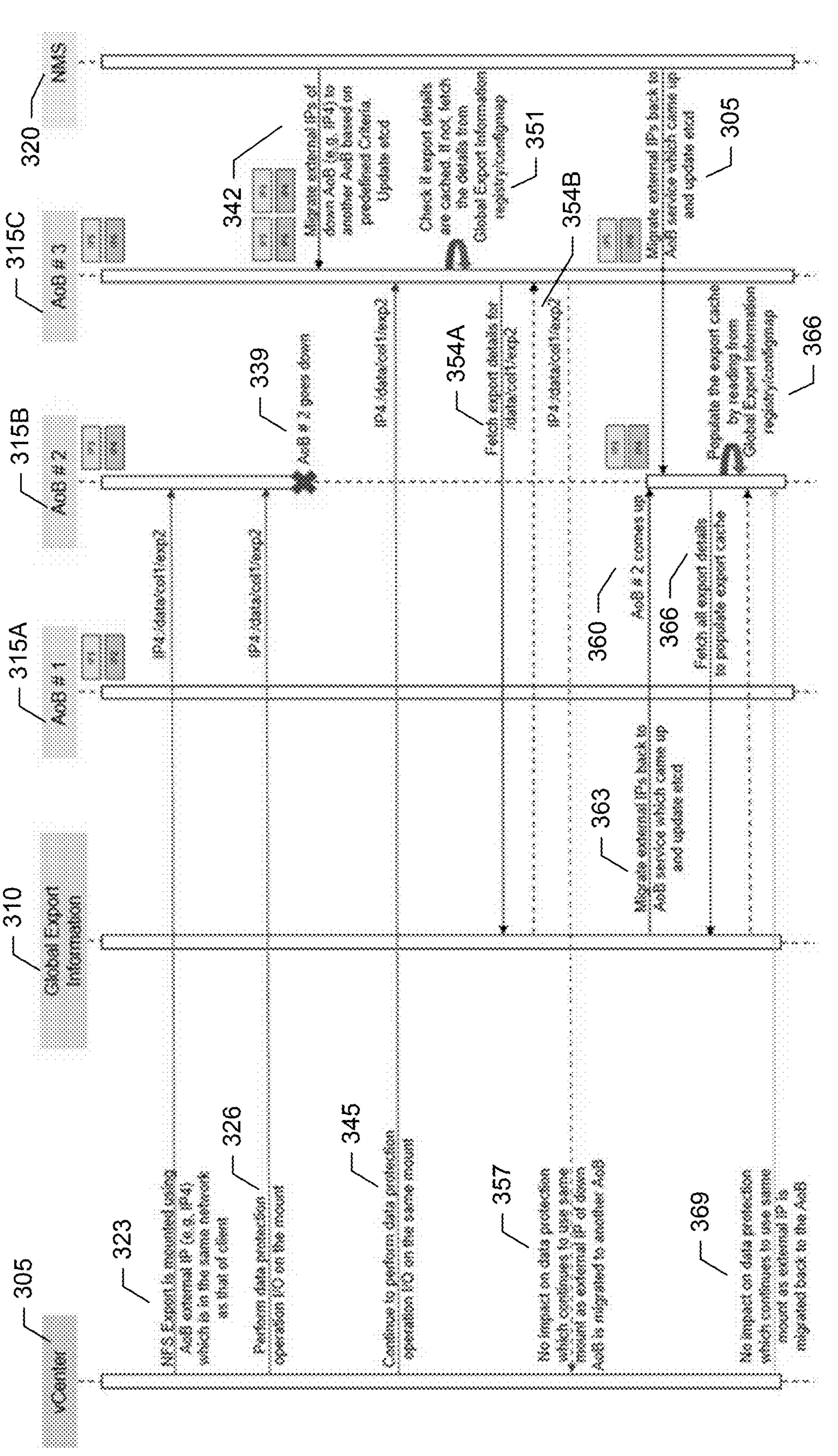
FIG. 3 shows a sequence diagram for handling a failover and failback, according to one or more embodiments.

FIG. 3 shows a sequence diagram of an example of steps in the failover and failback scenarios. The entities shown in FIG. 3 include a virtual machine manager (e.g., vCenter) 305, global export registry 310, first access object service 315A, second access object service 315B, third access object service 315C, and network management service 320. The global export registry is a storage system that persists details about an NFS export. The first access object service is accessible via IP addresses IP1 and IP2. The second access object service is accessible via IP addresses IP3 and IP4. The third access object service is accessible via IP addresses IP5 and IP6.

In a step 323, an NFS export is mounted by a client (e.g., NFSv3 client) using an external IP address which is in the same network as that of the client. In the example shown in FIG. 3, the external IP address (e.g., IP4) is associated with the second access object service and the NFS export is/data/col1/exp2.

In a step 326, data protection operation IOs are performed on the mount. The data protection operation IOs may involve, for example, accessing and restoring files from a virtual machine previously backed up to the data protection appliance and residing on temporary data store at the data protection appliance via a workflow that may be referred to as Instant Access/Instant Restore.

Figure 4:
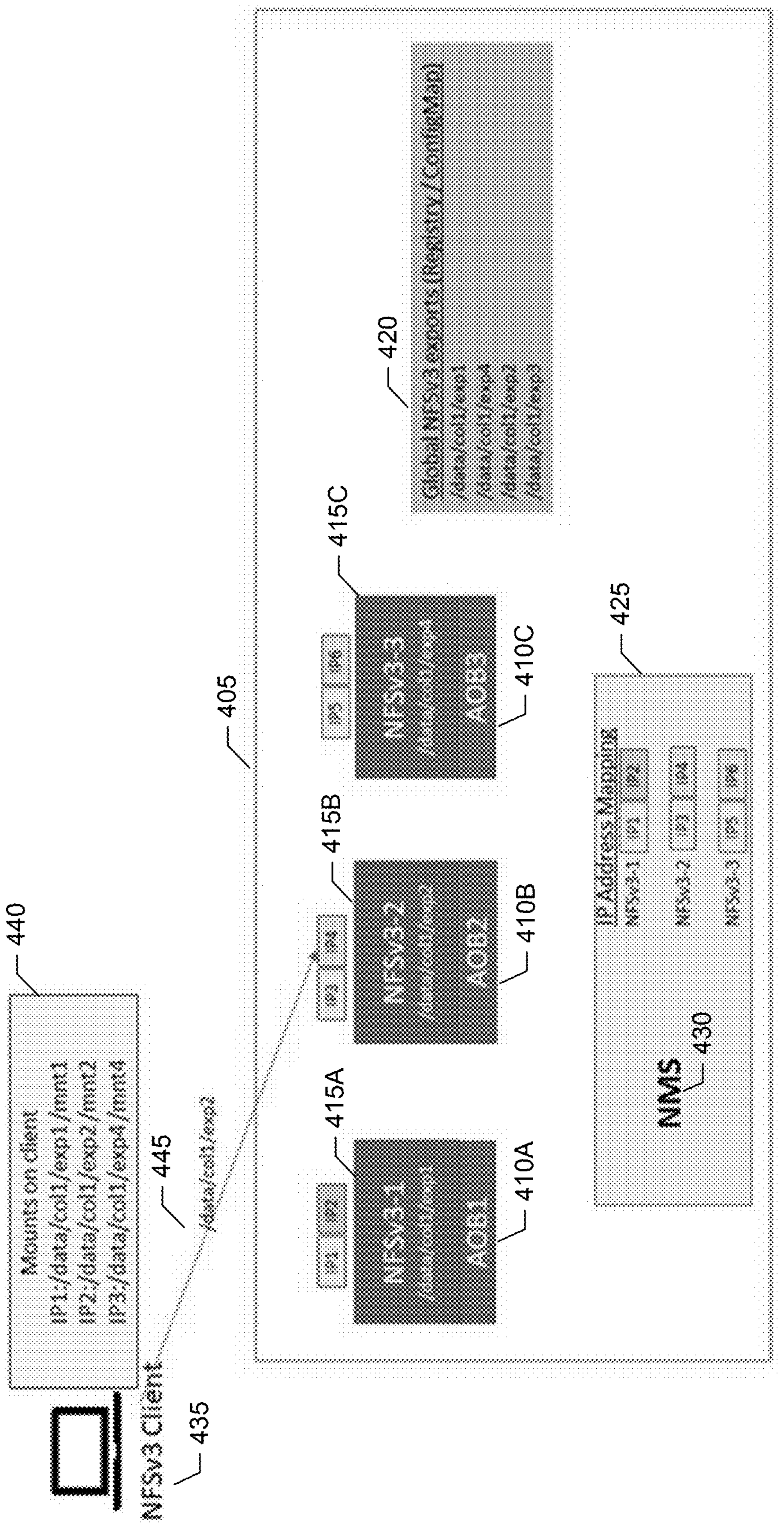
FIG. 4 shows a block diagram of a client accessing an export created on a node, according to one or more embodiments.

FIG. 4 shows a block diagram for the example shown in FIG. 3. Consider, as an example, that a data protection operation involves creating an NFS export on a particular node of the cluster within the data protection appliance. The NFS export may be created using, for example, a Representational State Transfer (REST) application programing interface (API) or command line interface of the data protection appliance. The NFS export may be mounted on a particular client using the external IP address of the particular node. Once the export is mounted, the mount point can be used for the data protection operation.

For example, an NFS export: exp2 may be created on the node AOB 2. Once this export is created on the AOB 2 node, the external IP address of the AOB 2 node can be used to mount the export on a client or, more particularly, an NFSv3 client. This mount point remains valid so long as the export is present and the node, e.g., AOB 2, is available. If the node, e.g., AOB 2, goes down, the mount point becomes invalid. In an embodiment, systems and techniques are provided to help ensure that the mount point remains valid even if the node on which the export was created (e.g., AOB 2 node) becomes unavailable. These systems and techniques help to ensure that the IP address remains reachable and continues to be valid. Further, systems and techniques help to ensure that the export created on the particular node that failed is available on other nodes of the cluster.

In an embodiment, the external IP address of the particular node that failed is migrated or reassigned to another node. If, for example, AOB 2 node goes down, the IP address used to reach AOB 2 node is migrated to another node of the cluster. The process to select an available node from among all the other available nodes in the cluster is based on probing the available nodes and evaluating an algorithm having multiple weights corresponding to different categories of load. The different weights set on the different categories are tallied or counted. The node with the highest number of "high" weights is selected as a failover node.

As shown in the example of FIG. 4, a data protection appliance 405 includes a set of nodes hosting access object services 410A-C, respectively. The access object services include NFSv3 servers 415A-C respectively. An NFSv3 server resides in each of the access object services. Each node (or access object service or NFSv3 server) is accessible via one or more external IP addresses.

For example, the first access object service is accessible via IP1 and IP2. The second access object service is accessible via IP3 and IP4. The third access object service is accessible via IP5 and IP6. NFS exports have been created on the NFSv3 servers. For example, the first NFSv3-1 server includes an NFS export having a path/data/col1/exp1. The second NFSv3-2 server includes an NFS export having a path/data/col1/exp2. The third NFSv3-3 server includes an NFS export having a path/data/col1/exp4.

A registry 420 stores details about the NFS exports such as the path information. Further, an IP address mapping table 425 is maintained by a network management service 430 of the data protection appliance. The IP address mapping table maps the NFSv3 servers and IP addresses at which they are accessible. For example, according to the mapping, the first NFSv3-1 server is accessible via IP1 and IP2. The second NFSv3-2 server is accessible via IP3 and IP4. The third NFSv3-3 server is accessible via IP5 and IP6. In other words, IP1 and IP2 are currently mapped to the first NFSv3 server on the first access object service. IP3 and IP4 are currently mapped to the second NFSv3 server on the second access object service. IP5 and IP6 are currently mapped to the third NFSv3 server on the third access object service.

A client 435 (or host, server, or other computing node having an NFSv3 client) is shown as having mounted one or more of the exported directories (e.g., NFS exports) into its own file system namespace, thereby making the file system of the data protection appliance appear as part of the local file hierarchy. In this example, mount points 440 on the client include IP1:/data/col1/exp1/mnt2, IP2:/data/col1/exp1/mnt2, and IP3:/data/col1/exp1/mnt4. An arrow 445 indicates current data protection IO operations on the mount point or path at IP4 and NFS export/data/col1/exp2 created at the second access object service (AOB2) having the second NFSv3 server (NFSv3-2).

Systems and techniques provide for awareness of the NFS exports on all NFSv3 server backend nodes despite NFSv3 not being a clustered protocol. For example, in an embodiment, the file system of the data protection appliance is a distributed or clustered file system where multiple nodes work together to provide a single, unified and highly-available file system.

The NFSv3 protocol, however, operates in a traditional client-server model and lacks capabilities for coordinating multiple servers to provide redundancy, load balancing, or failover. Clients can connect to a single NFSv3 server that exports the file system over the network. The server is responsible for storing and managing access to the files and the clients access these files remotely as if they were local. If, however, the NFSv3 server fails, the clients lose access to the files as there is no built-in failover. There is no internal mechanism in NFSv3 for multiple servers to share the same file system, for clients to automatically fail over to a different server, or for file locking across multiple servers.

To address the shortcomings of the NFSv3 protocol, in an embodiment, the NFS export created on an NFSv3 server is stored persistently in the scale-out data protection appliance. This enables multiple NFSv3 servers available on the cluster to access the created NFS exports and thus work on the cluster-wide NFS export. NFSv3 servers maintains a local in-memory cache of export information. This is an in-memory export cache that provides a quick access to the export information created on the NFSv3 server. Initially, the local in-memory export cache on all NFS servers are empty. When a new NFS export is created on an NFSv3 server, the export details are first inserted in the local in-memory export cache followed by saving the export details in the persistent storage. Each NFSv3 server ensures that the export details are always saved in the persistent storage. Thus, the local in-memory export cache on each NFSv3 server holds export details created on the respective NFSv3 server but the persistent storage holds the NFS export details of all the exports created on NFSv3 servers available on the scale-out data protection appliance. For example, a global export registry of the appliance (or ConfigMap service) may include first and second NFS export details. The first NFS export details may be associated with a first NFS export created on a first NFSv3 server. The second NFS export details may be associated with a second NFS export created on a second NFSv3 server, different from the first NFSv3 server.

When an NFS client connects to the NFSv3 server to access the export, the local in-memory export cache is refreshed from the persistent storage if the export details are not already present in the in-memory export cache. The NFSv3 server then fetches the export details from the local in-memory export cache and proceeds to service the request of the NFS client.

In the example shown in FIG. 4, the details of export/data/col1/exp1 created on NFS server NFSv3-1 are inserted in NFSv3-1 local in-memory export cache as well as persistent storage. Similarly, details of exports/data/col1/exp2 and/data/col1/exp3 created on NFSv3 servers NFSv3-2 and NFSv3-3, respectively, are inserted in their respective NFSv3 server's in-memory export cache as well as persistent storage. Thus, the persistent storage which is accessible to all the NFSv3 servers contain details of all exports created by the NFSv3 servers.

Each NFSv3 servers maintains a local in-memory export cache to store the export details. The NFSv3 server also stores the export details in persistent storage. There can be multiple options for the persistent storage:

In an embodiment, a cluster-wide global registry (backed by a database (DB)) is used to store and access the export details on the NFSv3 servers. The cluster-wide global registry is a persistent store that is accessible to all NFSv3 servers available on the scale-out data protection appliance. The global registry serves as a central repository for persisting the NFS export information. Exports created on any of the NFSv3 servers are persisted in the global registry thus making it available to any of the NFS servers on the cluster. The global registry is backed by a relational database. This registry is made available to the NFSv3 servers as key-value store. A key value store is a type of storage system that offers persistent storage. The key value store may be a distributed key value store such that it can run across multiple nodes or servers so that it can handle large datasets, provide fault tolerance in cases of node failures, and scale up (or down) via the addition (or removal) of nodes.

Table A below shows an example of NFS export table stored in the global registry where details such as the export name, export path, export client and applicable NFS version are stored.

TABLE A

| Index | Name | Path | Clients | Options |
|---|---|---|---|---|
| 0 | Exp1 | /data/col1/exp1 | 192.168.1.1 | vers = 3 |
| 1 | Exp2 | /data/col1/exp2 | * | vers = 3 |
| 2 | Exp3 | /data/col1/exp3 | 192.168.1.2 | vers = 3 |
| . . . | . . . | . . . | . . . | . . . |

Thus, when an NFS export is created on an access object service, details about the export are persisted in the global registry. The global registry is accessible from any of the nodes of the cluster. In other words, each node of the cluster has access to the NFS export details. So, details about a first NFS export created on a first access object service may be accessed by a second access object service.

In another embodiment, a central ConfigMap management is used for storing and accessing export details across the NFSv3 servers. The central ConfigMap management enables all the NFSv3 servers to store and access the persisted export details. In this embodiment, each time an NFS export is created, details about the NFS export is persisted to ConfigMap.

A ConfigMap is a Kubernetes object used to store non-confidential data in key-value pairs. As per the Kubernetes specification, the ConfigMap created in one Kubernetes namespace is accessible only in that Kubernetes namespace. Thus, if an NFSv3 server persists the export details in a ConfigMap, the export details are accessible to NFSv3 servers that are part of the same Kubernetes namespace. To address this accessibility issue, a central ConfigMap management is provided which enables the NFSv3 server to store and access the export details. Following are the details of how a Central ConfigMap Management may be used to store the export details:

A) Each NFSv3 server persists the export details in a Kubernetes object ConfigMap.

B) This same ConfigMap is mounted by all the NFSv3 servers which are available on the cluster.

C) For any updates done to this ConfigMap, the changes are made visible to all the NFSv3 servers which are available on the cluster. To handle this, a polling mechanism is provided which watches for updates done to the ConfigMap.

D) Thus if a new export details are added to the ConfigMap or existing export details are deleted from the ConfigMap, with the polling mechanism all NFSv3 servers are made aware of the changes to the NFS export.

ConfigMap includes a size limitation of 1 megabyte (MB). In an embodiment, access object services are configured as privileged services and are thus able to update ConfigMap.

Referring back now to FIG. 3, consider that a node of the data protection appliance becomes unavailable, e.g., second access object service (AOB 2) or NFSv3-2 server goes down (step 339). In a step 342, the network management service probes or checks resource utilization of other available nodes in the cluster (e.g., AOB 1 and AOB 3) in the cluster to select another node as a failover. In this example, AOB 3 has been identified as the failover and the network management service migrates the external IPs (e.g., IP3 and IP4) of the down AOB based on predefined criteria for selecting a failover node. This allows data protection operation IO to continue to be conducted on the same mount point, e.g., IP4:/data/col1/exp2 (step 345).

As discussed, in a step 345, when the NFS client connects via the virtual machine manager to the NFSv3 server on the failover node (e.g., AOB 3) to access the export, the node checks if the export details are cached (step 351). If not, the node fetches the details from the global export information registry (or ConfigMap) for/data/col1/exp2 (step 354A,B). In a step 357, the result is that there is no impact on the data protection operation IOs. That is, the data protection operations can continue using the same NFS mount as the external IP address (e.g., IP4) of the down AOB (e.g., AOB 2) has been migrated or reassigned to another AOB (e.g., AOB 3).

Figure 5:
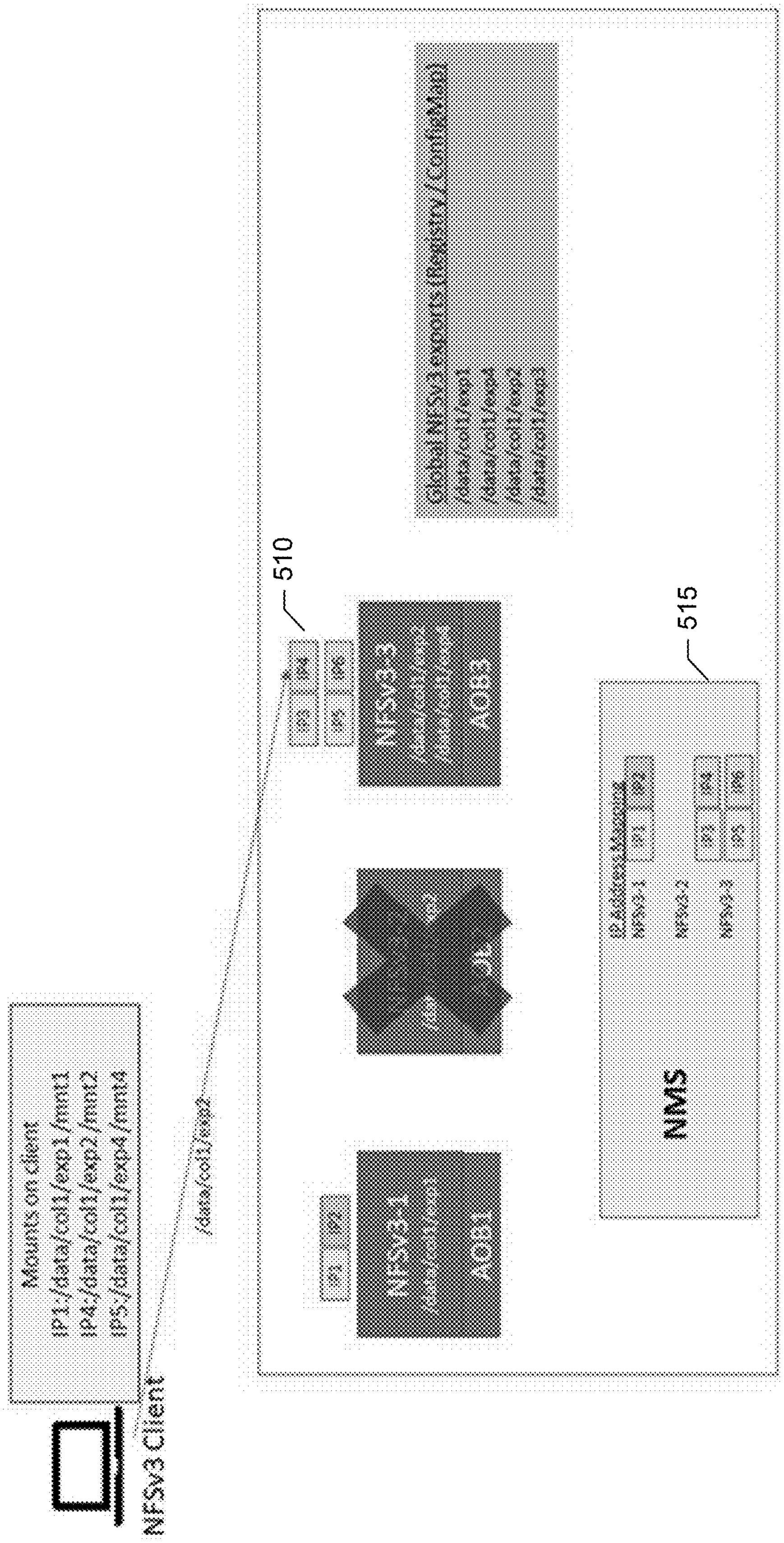
FIG. 5 shows a block diagram of a failover when the node fails, according to one or more embodiments.

FIG. 5 shows a block diagram of the failover scenario. An "X" superimposed on AOB 2 indicates that the node or relevant services of the node (e.g., NFSv3 server, access object service, or both) have become unavailable. Node AOB 2 has gone down and the external IP addresses through which the node is accessed are migrated to another node. The selection of the other node, e.g., failover node, is based on evaluating an algorithm and determining which AOB node satisfies the criteria of the algorithm.

Specifically, external IP addresses associated with the failed node have been migrated 510 to another node identified as the failover (e.g., AOB 3). More particularly, external IP address IP4 for the mount path/data/col1/exp2 has been reassigned from the failed node (e.g., AOB 2 or NFSv3-2) to the failover node (e.g., AOB 3 or NFSv3-3). The reassignment of the IP address to the failover node is shown in an updated mapping 515 maintained by the network management service.

That is, upon the failure of the NFSv3 server or the appliance node, the IP address of the NFSv3 server is assigned to another available NFSv3 server. In case of the appliance node failure, the new NFSv3 server is present on another node of the scale-out appliance. For a client mounting the NFSv3 export, the movement of the assigned NFSv3 server IP address is transparent which enables the mount on the client to work seamlessly. That is, after the failure of the node, the client may continue using the same IP address to access the export as before the failure of the node.

Referring back now to FIG. 3, in a step 360, when the failed NFSv3 server or the node is recovered, the network management service finds the NFSv3 server that has recovered. In a step 363, the network management service then migrates the IP address back to the recovered NFSv3 server. The network management service tracks the migration or assignment of the IP address. At the startup of the NFSv3 server, the export details are populated in the local in-memory export cache from the persistent storage (step 366). In a step 369, the export cache of the recovered NFSv3 server is populated by reading the global export information from the registry (or ConfigMap). After or post recovery, the subsequent client requests are then redirected to the recovered NFSv3 server. There is no impact on data protection operations which continue to use the same mount as the external IP addresses are migrated back to the AOB (AOB 2) (step 369).

For example, when the failed NFSv3 server 2 (NFSv3-2) shown in FIG. 5 comes back up, the network management service finds that this server has recovered and then it moves back the IP address assigned to server 3 (NFSv3-3/AOB3) back to server 2 (NFSv3-2/AOB 2). The IA/IR connection is also reset on the NFSv3 server 3 (NFSv3-3/AOB3) so that post retry the connections go or are routed to the appropriate servers. This is to avoid a long living connection staying with NFSv3 server 3 (NFSv3-3/AOB3). At the startup of server 2 (NFSv3-2/AOB 2), it populates its cache from the registry. The registry already contains the export/data/col1/exp2 access by the client hence the cache also contains this export. All the subsequent requests of the client now goes or is routed to server 2 (NFSv3-2/AOB 2) instead of server 3 (NFSv3-3/AOB3) and they are served successfully.

Referring back now to FIG. 2, as discussed, when a node on which an NFS export has been created and mounted by a client for data protection IO operations fails, the network management service is responsible for selecting another node as a failover (step 230). Specifically, the network management service is aware of all the external IPs of the NFSv3 server backend nodes available on the cluster. Upon the failure of the NFSv3 server backend node, the network management service migrates the IP address to another NFSv3 server backend node. As part of migration, the network management service selects an NFSv3 server backend node which has sufficient resources to carry out the on-going data protection operation. This ensures that after or post failover, the NFSv3 server backend node does not get overloaded and thus there is minimal or little performance impact to the on-going data protection operation and other operations that the node may be involved with.

In an embodiment, the network management service executes an algorithm that checks multiple weights, metrics, or resource measurements associated with a selected NFSv3 server backend node to understand or determine if the selected NFSv3 server backend node is currently not overloaded and can be used as failover node. If any/multiple weights are observed to be as high, the algorithm considers the NFSv3 server backend node as overloaded and skipping the same. The subsequent sections describe details of each of the weights associated with the NFSv3 server that can be used to determine whether the NFSv3 server is overloaded.

In an embodiment, there is a first weight associated with a count of streams currently being handled by an NFSv3 server. There is a second weight associated with CPU, memory, network and disk currently being utilized by the NFSv3 server. There is a third weight associated with a total number or count of connection requests currently being handled by the NFSv3 server. There is a fourth weight associated with workloads currently being handled by the NFSv3 server. There is a fifth weight associated with historical workloads handled by the NFSv3 server. There is a sixth weight associated with whether the NFSv3 server is currently serving as a failover node for a different node that has failed. These weights may be used singularly or in combination with two or more other weights.

In an embodiment, threshold weights for various categories are calculated based on compute resources of the node and available to the NFSv3 server. For example, as discussed, the nodes of the cluster may not necessarily be provisioned with the same amount of compute resources. Different nodes may contain processors, components, or other devices with different bandwidth and computational capabilities. Thus, a node provisioned with a greater amount of compute resources as compared to another node may have greater threshold values as compared to the other node. For example, the node may be able to handle a greater number of streams, connections, and so forth without becoming overloaded as compared to the other node.

FIG. 6 shows an example of a table summarizing the threshold weight values that may be calculated or computed for different weight categories based on compute resources available to the NFSv3 servers. For example, a first column of the table lists the weight categories. Second, third, and fourth columns list the NFSv3 servers, respectively, in the cluster. Thus, NFSv3 server 1 has a first threshold weight (NFSv3-Server-1TW1) for the stream category. NFSv3 server 2 has a second threshold weight (NFSv3-Server-1TW1) for the stream category. And so forth. Different NFSv3 servers may have different threshold values for the same weight category because the different NFSv3 servers may be provisioned with different compute resources. Different NFSv3 servers may have the same threshold values for the same weight category because the different NFSv3 servers may be provisioned with the same compute resources.

FIG. 7 shows an example of a table summarizing results from checking stream counts being handled by the NFSv3 servers and comparing the stream counts against the respective threshold stream counts calculated for each NFSv3 server. More particularly, this weight is associated with availability of the read/write/replication streams counts on the NFSv3 server. The network management service checks for weight associated with the read/write/replication stream counts to know or determine if the NFSv3 server is overloaded. The current availability of streams on the NFSv3 server is one of the criteria to understand whether NFSv3 server can be selected for the failover. A threshold value is computed for each NFSv3 server based on its computed power which specifies the maximum number of read/write/replication stream counts that can be served by the NFSv3 server. A periodic probe checks for the total number file operations currently served by the NFSv3 server. If the total number of file operations served is equal to or more than threshold, the periodic probe sets the weight as low for the overloaded NFSv3 server. The network management service may exclude this NFSv3 server for failover if this weight is observed as low. In case the periodic probe observes that the total number of file operations served by the NFSv3 server is less than NFSv3 server's threshold value, the periodic probe resets the overload weight enabling this server to be selected for failover.

According to the sample data shown in FIG. 7, a stream weight for a first NFSv3 server has been set to "high," thereby indicating that a count of the streams currently being handled by the first NFSv3 server is below a threshold stream weight calculated for the first NFSv3 server. A stream weight for a second NFSv3 server has been set to "low," thereby indicating that a count of the streams currently being handled by the second NFSv3 server is at or above a threshold stream weight calculated for the second NFSv3 server. A stream weight for a third NFSv3 server has been set to "low," thereby indicating that a count of the streams currently being handled by the third NFSv3 server is at or above a threshold stream weight calculated for the third NFSv3 server.

FIG. 8 shows an example of a table summarizing results from checking current resource (e.g., CPU, memory, network, and disk) utilization of the NFSv3 servers and comparing the utilization against the respective threshold utilization values calculated for each NFSv3 server. More particularly, this weight is associated with CPU/memory/network/disk utilization of the NFSv3 server. The network management service checks for weight associated with CPU/memory/network/disk utilization of the NFSv3 server to know or determine if the NFSv3 server is overloaded. The NFSv3 server's current CPU, memory, network and disk utilization is one of the criteria to understand or determine whether the NFSv3 server can be selected for the failover. A threshold value is computed for each NFSv3 server based on its computed power which specifies the maximum CPU/memory/network/disk utilization supported by the NFSv3 server.

The periodic probe checks for the NFSv3 server's current CPU/memory/network/disk utilization. If it is found to be equal to or more than threshold value, the period probe sets the weight as "low" for the overloaded NFSv3 server. The network management service may exclude this NFSv3 server for failover if this resource utilization weight is observed as "low." In a case where the periodic probe observes that the CPU/memory/network/disk utilization of the NFSv3 server is less than NFSv3 server's threshold value, the periodic probe resets the overload weight enabling this service to be selected for redirection requests. That is, the network management service may restart mapping files to this service.

According to the sample data shown in FIG. 8, a resource utilization weight for the first NFSv3 server has been set to "low," thereby indicating that current resource utilization of the first NFSv3 server is at or above a threshold resource utilization weight calculated for the first NFSv3 server. A resource utilization weight for the second NFSv3 server has been set to "low," thereby indicating that a current resource utilization for the second NFSv3 server is at or above a threshold resource utilization weight calculated for the second NFSv3 server. A resource utilization weight for the third NFSv3 server has been set to "high," thereby indicating that current resource utilization by the third NFSv3 server is below a threshold resource utilization weight calculated for the third NFSv3 server.

FIG. 9 shows an example of a table summarizing results from checking a count of connections currently being handled by the NFSv3 servers and comparing the connection counts against respective threshold connection counts calculated for each NFSv3 server. More particularly, this weight is associated with a total number of connection requests currently served by the NFSv3 server. The network management service checks for weight associated with the total number of connections currently served by the NFSv3 server to know or determine if the NFSv3 server is overloaded. The total number of connections currently served the NFSv3 server is one of the criteria to understand or determine whether the NFSv3 server can be selected for the failover. A threshold value is computed for each NFSv3 server to understand total number of connections supported by the NFSv3 server.

The periodic probe checks for the total number of connection requests currently served by the NFSv3 server. If it is found to be equal to or more than the threshold value, the period probe sets the weight as "low" for the overloaded NFSv3 server. The method may exclude this NFSv3 server for failover if this weight is observed as "low." In a case where the periodic probe observes that the total number of connections is less than threshold, the periodic probe resets the overload weight enabling this NFSv3 server to be selected for failover.

According to the sample data shown in FIG. 9, a connection weight for the first NFSv3 server has been set to "high," thereby indicating that a count of connections currently being handled by the first NFSv3 server is below a threshold connection weight calculated for the first NFSv3 server. A connection weight for the second NFSv3 server has been set to "low," thereby indicating that a count of connections currently being handled by the second NFSv3 server is at or above a threshold connection weight calculated for the second NFSv3 server. A connection weight for the third NFSv3 server has been set to "low," thereby indicating that a count of connections currently being handled by the third NFSv3 server is at or above a threshold connection weight calculated for the third NFSv3 server.

In an embodiment, there is a weight associated with current scale out protection appliance workload. In this embodiment, the network management service checks for weight associated with the current scale out protection appliance workload to know or determine if the NFSv3 server is overloaded. The NFSv3 server's parameters such as read throughput, write throughout, protocol latency, protocol load percentage, protocol wait time, network throughput, and the like are measured to understand or determine if the NFSv3 server can be selected by the network management service for the failover. A threshold value is computed for each NFSv3 server based on its computed power which specifies the maximum read throughput, write throughout, protocol latency, protocol load percentage, protocol wait time, and network throughput supported by the NFSv3 server.

The periodic probe checks for the current read throughput, write throughout, protocol latency, protocol load percentage, protocol wait time, and network throughput of the NFSv3 server. If it is found to be equal to or more than the threshold value, the period probe sets the weight as "low" for the overloaded NFSv3 server. The network management service may exclude this NFSv3 server for redirection requests if this weight is observed as "low." In a case where the periodic probe observes that read throughput, write throughout, protocol latency, protocol load percentage, protocol wait time, and network throughput is less than the threshold, the periodic probe resets the overload weight enabling this NFSv3 server to be selected for the failover.

FIG. 10 shows an example of a table summarizing results from checking historical workload weights and comparing the historical workload weights against respective threshold historical weights calculated for each NFSv3 server. More particularly, this weight is associated with historical workloads served by the NFSv3 server earlier at that time of the day and time of the week and month. The network management service checks for weight associated with historical workloads served by the NFSv3 server earlier at that time of the day/time of the week/month. For example, in some cases, multiple full backups are usually scheduled to run on weekends when NFSv3 server may observe a heavier workload than usual. Details of each of these backups may stored in persistent storage for reference. This workload data may include details such as connections used during backup, memory and CPU utilized and client counts for each of the NFSv3 server. A threshold value is calculated based on the stream counts used by an NFSv3 server, memory and CPU utilized by the NFSv3 server and clients served by the NFSv3 server.

The periodic probe checks for these historical workload details. If it is found to be equal to or more than the threshold value, the period probe sets the weight as "low" for the overloaded NFSv3 server. The network management service may exclude this NFSv3 server for failover if this weight is observed as "low." In a case where the periodic probe observes that these historical workload details are less than threshold, the periodic probe resets the overload weight enabling NFSv3 server to be selected for failover.

FIG. 11 shows an example of a table summarizing results from checking whether an NFSv3 server is currently serving as a failover for another failed NFSv3 server. In an embodiment, if the NFSv3 server is currently serving as a failover for another failed NFSv3 server, the failover weight is set to "low." If the NFSv3 server is not currently serving as a failover for another failed NFSv3 server, the failover weight is set to "high." According to the sample data shown in FIG. 11, the first NFSv3 server is currently serving as a failover for another failed NFSv3 server. Thus, the failover weight has been set to "low." The second NFSv3 server is currently serving as a failover for another failed NFSv3 server. Thus, the failover weight has been set to "low." The third NFSv3 server is not currently serving as a failover for another failed NFSv3 server. Thus, the failover weight has been set to "high."

FIG. 12 shows an example of a table collecting the weights set on some of the different weight categories for the NFSv3 servers. This table may be used to rank the NFSv3 servers and determine which NFSv3 server is not overloaded (and is unlikely to soon become overloaded) and thus eligible for selection as a failover. In an embodiment, the algorithm counts the number of "high" and "low" weights that have been set for each of the different weight categories to identify an NFSv3 server that is suitable as a failover, e.g., not overloaded.

In the example shown in FIG. 12, the first NFSv3 server has a final weight as "high" based on two weight categories being assigned a score of "high" and two other weight categories being assigned a score of "low." In an embodiment, a tie in the number of "high" scores and "low" scores results in an overall score of "high." In another embodiment, a tie may result in an overall score of "low." The second NFSv3 server has a final weight of "low" based on four weight categories being assigned a score of "low." The third NFSv3 server has a final weight of "low" based on three weight categories being assigned a score of "low" and one weight category being assigned a score of "high." Thus, in this example, the first NFSv3 server is selected for failover because its final weight of "high" indicates that it is the least overloaded NFSv3 server.

Thus, in an embodiment, an algorithm evaluates a set of criteria to determine which node is not overloaded and thus suitable as a failover (or, conversely, which node is overloaded and should be excluded from being a failover). As discussed, the nodes (or servers) may be probed to collect their connection counts. The nodes are then scored or weighted according to their connection counts. A node having a connection count higher than a threshold connection count established for that node will have its connection count weight set to "low," thereby reducing the chances of the node being selected as a failover. A node having a connection count lower than a threshold connection count established for that node will have its connection count weight set to "high," thereby increasing the chances of the node being selected as a failover.

For example, as shown in the sample data of FIG. 7, second and third nodes (or second and third NFS servers) have a connection count that is higher than corresponding connection count thresholds calculated for each node. Thus, connection count weights for the first and second nodes have been set to "low." The connection count for the first node (or first NFS server) was found to be lower than a threshold connection count calculated for the first node, thus its connection count weight has been set to "high," thereby increasing its chances for being selected as a failover.

CPU and memory are another consideration in determining whether a node may be overloaded. As shown in the sample data of FIG. 8, CPU/memory utilization for the first and second nodes (or first and second NFS servers) was observed to be higher than corresponding thresholds calculated for the nodes. Thus, the CPU and memory weights for the first and second nodes has been set to "low," thereby decreasing the chances of selecting the first or second node as a failover. CPU/memory utilization for the third node was observed to be lower than a corresponding threshold calculated for the third node. Thus, the CPU and memory weight for the third node has been set to "high," thereby increasing the chances of selecting the third node as a failover.

Connection rates or total number of connections currently being served by the nodes is another consideration in determining whether a node may be overloaded. If a connection count for a node is observed to be higher than a threshold connection count calculated for the node, the connection count weight is set to "low," thereby decreasing the chances of selecting the node as a failover. If a connection count for a node is observed to be lower than a threshold connection count calculated for the node, the connection count weight is set to "high," thereby increasing the chances of selecting the node as a failover.

Historical workloads handled by the nodes is another consideration in determining whether a node may be overloaded. In an embodiment, historical workloads can be used to assess the likelihood that a node or server may soon become occupied with processing a workload. A node that may soon become occupied with processing a workload (based on the times and dates of past workloads processed by the node) may have its corresponding historical workload weight set to "low," thereby decreasing the chances of selecting the node as a failover. A node that is unlikely to soon become occupied with processing a workload (based on the times and dates of past workloads processed by the node) may have its corresponding historical workload weight set to "high," thereby increasing the chances of selecting the node as a failover.

In an embodiment, a method includes: detecting that a node in a cluster of nodes has failed; obtaining a schedule indicating historical workloads handled by another node of the cluster; comparing a current time against the schedule; if the current time falls near or within the schedule, setting a weight on the other node that reduces a probability of the other node being selected as a failover; and if the current time falls outside the schedule, setting a weight on the other node that increases the probability of the other node being selected as the failover. Whether the current time can be considered to be "near" the schedule may be a configurable value. For example, the system may be configured such that a current time that is less than 5 minutes away from a start time of a historical workload is considered "near" the schedule. Alternatively, the system may be configured such that a current time that is less than 10 minutes away from a start time of a historical workload is considered "near" the schedule, and so forth.

In an embodiment, once weights for the various categories have been set for each of the nodes or servers, the weights are tallied or counted to determine which particular node has the highest number of "high" weights and thus should be selected as a failover. As shown in the example of FIG. 12, that node is the first node or first NFSv3 server and the node is selected for the migration.

Setting a weight on a category as "low" when a corresponding threshold has been exceeded and setting as "high" when the corresponding threshold has not been exceeded is merely an example of one particular embodiment. In other embodiments, a different or opposite convention may instead be used. For example, in another embodiment, weight on a category may be set as "low" when a corresponding threshold has not been exceeded and the weight may be set as "high" when the corresponding threshold has been exceeded. One of skill in the art will recognize that different labels or conventions may be used that give the same functionality. A further discussion of determining whether or not a node is overloaded is provided in U.S. patent application Ser. No. 18/648,104, filed Apr. 26, 2024, and is incorporated by reference along with all other references cited.

In an embodiment, systems and techniques utilize multiple weights that enable selection of and avoid overloading any of the NFSv3 servers during failover and thus ensuring that there is minimal or little impact to the performance of the ongoing data protection operation. These systems and techniques also help ensures that upon the failure of the NFSv3 backend node, the IP address of the NFSv3 backend node is assigned or migrated to another available NFSv3 backend node such that the selected NFSv3 backend node has sufficient resources. As NFSv3 is not a clustered protocol, the NFS exports created on an NFSv3 server are available only on that specific NFSv3 server where they are created and not visible to other NFSv3 servers. Hence in a clustered environment with NFSv3 protocol it is not possible to scale the NFSv3 servers unless the export details are available globally, i.e., across the available NFSv3 servers.

In an embodiment, systems and techniques provides method balancing between or among nodes in a cluster in case of failure to avoid reaching per-node fixed resource limits; selection of a non-overloaded NFSv3 server during the failover ensure there is minimal or little impact; resource based load balancing of nodes within the cluster that remains transparent to the client; a sharing of an export across multiple node of the cluster; and a way to use an NFSv3 mount in a cluster environment by sharing export information across all nodes.

In an embodiment, there is a method comprising: creating a Network File System (NFS) export on a node of a data protection appliance, the NFS export comprising a backup to be accessed by an access object (AOB) service hosted by the node, the node being part of a cluster of nodes comprising other AOB services and NFSv3 servers accessible via external Internet Protocol (IP) addresses, and the AOB services being responsible for handling different portions of a deduplication filesystem of the appliance within which backups are organized, each AOB service still having access to other portions of the filesystem assigned to other AOB services;

mounting the NFS export at an NFSv3 client; allowing the NFSv3 client to conduct data protection input/output (IO) on the NFS export using an external IP address associated with the node; maintaining a mapping of the NFS export and the external IP address associated with the node; upon a failure of the node, probing resource utilization of other available nodes in the cluster to select a failover node; consulting the mapping to identify the external IP address associated with the failed node; and migrating the external IP address from the failed node to the failover node, thereby allowing requests for the data protection IO on the NFS export by the NFSv3 client to continue using the external IP address previously associated with the failed node.

Probing resource utilization may include: fetching a plurality of resource utilization metrics associated with the other available nodes, the plurality of resource utilization metrics comprising a first resource utilization metric indicating a count of streams being handled by an available node, a second resource utilization metric indicating CPU, memory, network, and disk being consumed by the available node, a third resource utilization metric indicating a number of connection requests being handled by the available node, a fourth resource utilization metric indicating workload being handled by the available node, a fifth resource utilization metric indicating historical workloads previously handled by the available node, and a sixth resource utilization metric indicating whether the available node is currently serving as a failover node for a different failed node; comparing the plurality of resource utilization metrics to corresponding thresholds; setting weights on the available nodes based on the comparison; and evaluating the weights set on the available nodes to identify an available node that should serve as the failover node.

The method may include storing the mapping in a ConfigMap object. The method may include storing the mapping in a global registry. The method may include upon a recovery of the failed node, migrating the external IP address from the failover node back to the now recovered node. In an embodiment, the backup comprises a backup image of a virtual machine backed up from a production data store to the data protection appliance and the method further comprises: booting the virtual machine from the data protection appliance.

In another embodiment, there is a system comprising: a processor; and memory configured to store one or more sequences of instructions which, when executed by the processor, cause the processor to carry out the steps of: creating a Network File System (NFS) export on a node of a data protection appliance, the NFS export comprising a backup to be accessed by an access object (AOB) service hosted by the node, the node being part of a cluster of nodes comprising other AOB services and NFSv3 servers accessible via external Internet Protocol (IP) addresses, and the AOB services being responsible for handling different portions of a deduplication filesystem of the appliance within which backups are organized, each AOB service still having access to other portions of the filesystem assigned to other AOB services; mounting the NFS export at an NFSv3 client; allowing the NFSv3 client to conduct data protection input/output (IO) on the NFS export using an external IP address associated with the node; maintaining a mapping of the NFS export and the external IP address associated with the node; upon a failure of the node, probing resource utilization of other available nodes in the cluster to select a failover node; consulting the mapping to identify the external IP address associated with the failed node; and migrating the external IP address from the failed node to the failover node, thereby allowing requests for the data protection IO on the NFS export by the NFSv3 client to continue using the external IP address previously associated with the failed node.

In another embodiment, there is a computer program product, comprising a non-transitory computer-readable medium having a computer-readable program code embodied therein, the computer-readable program code adapted to be executed by one or more processors to implement a method comprising: creating a Network File System (NFS) export on a node of a data protection appliance, the NFS export comprising a backup to be accessed by an access object (AOB) service hosted by the node, the node being part of a cluster of nodes comprising other AOB services and NFSv3 servers accessible via external Internet Protocol (IP) addresses, and the AOB services being responsible for handling different portions of a deduplication filesystem of the appliance within which backups are organized, each AOB service still having access to other portions of the filesystem assigned to other AOB services; mounting the NFS export at an NFSv3 client; allowing the NFSv3 client to conduct data protection input/output (IO) on the NFS export using an external IP address associated with the node; maintaining a mapping of the NFS export and the external IP address associated with the node; upon a failure of the node, probing resource utilization of other available nodes in the cluster to select a failover node; consulting the mapping to identify the external IP address associated with the failed node; and migrating the external IP address from the failed node to the failover node, thereby allowing requests for the data protection IO on the NFS export by the NFSv3 client to continue using the external IP address previously associated with the failed node.

Figure 13:
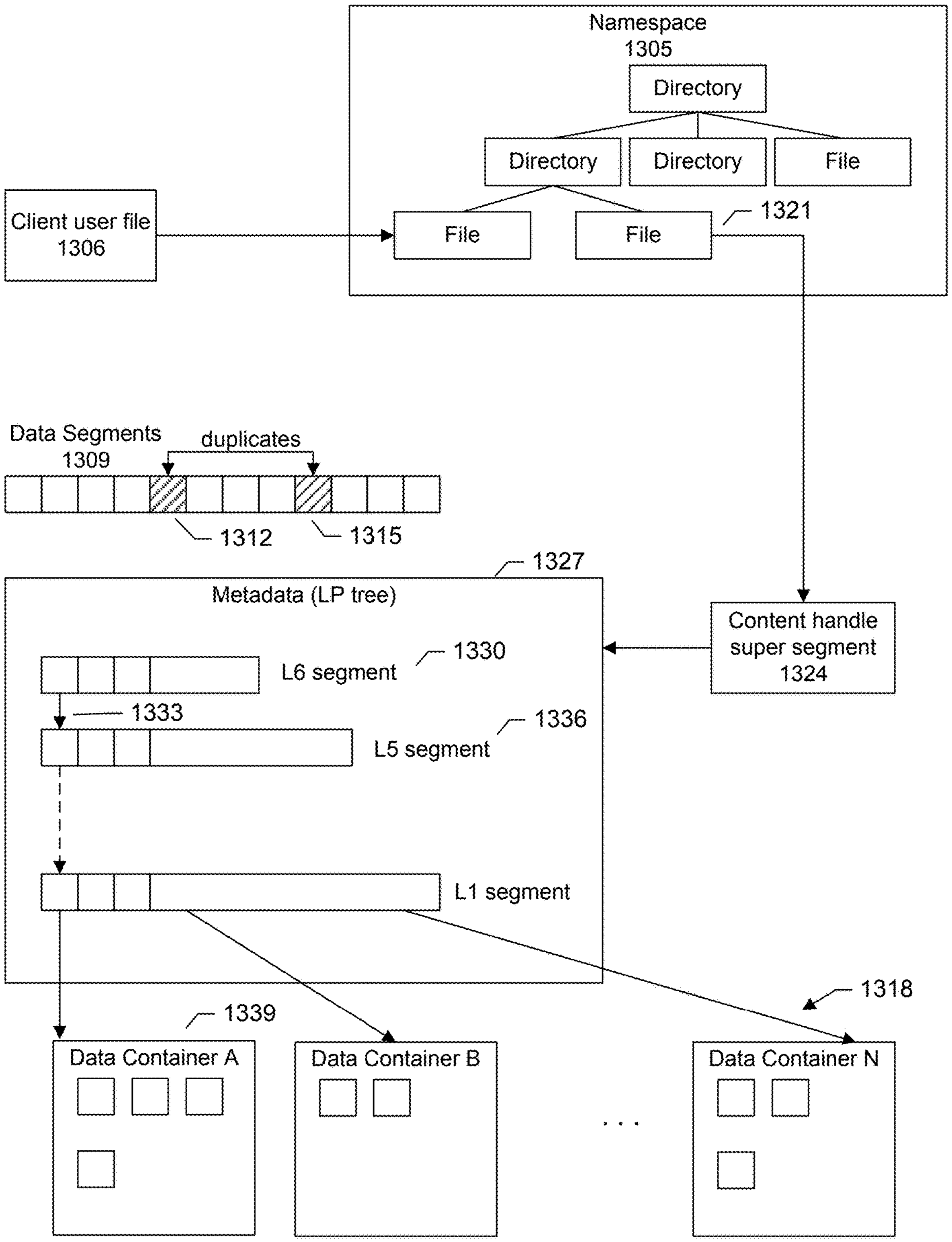
FIG. 13 shows an example of a deduplication process, according to one or more embodiments.

As discussed, In an embodiment, the filesystem is a deduplicated filesystem. FIG. 13 shows a block diagram illustrating a deduplication process of the filesystem according to one or more embodiments. A deduplicated filesystem is a type of filesystem that can reduce the amount of redundant data that is stored. As shown in the example of FIG. 13, the filesystem maintains a namespace 1305. Further details of a filesystem namespace are provided in FIG. 3 and the discussion accompanying FIG. 14.

As data, such as incoming client user file 1306, enters the filesystem, it is segmented into data segments 1309 and filtered against existing segments to remove duplicates (e.g., duplicate segments 1312, 1315). A segment that happens to be the same as another segment that is already stored in the filesystem may not be again stored. This helps to eliminate redundant data and conserve storage space. Metadata, however, is generated and stored that allows the filesystem to reconstruct or reassemble the file using the already or previously stored segment. Metadata is different from user data. Metadata may be used to track in the filesystem the location of the user data within a shared storage pool. The amount of metadata may range from about 2 or 4 percent the size of the user data.

More specifically, the filesystem maintains among other metadata structures a fingerprint index. The fingerprint index includes a listing of fingerprints corresponding to data segments already stored to the storage pool. A cryptographic hash function (e.g., Secure Hash Algorithm 1 (SHA1)) is applied to segments of the incoming file to calculate the fingerprints (e.g., SHA1 hash values) for each of the data segments making up the incoming file. The fingerprints are compared to the existing fingerprints in the fingerprint index. Matching fingerprints indicate that corresponding data segments are already stored. Non-matching fingerprints indicate that the corresponding data segments are unique and should be stored.

Unique data segments are packed and stored in fixed size immutable containers 1318. There can be many millions of containers tracked by the filesystem. The fingerprint index is updated with the fingerprints corresponding to the newly stored data segments. A content handle 1321 of the file is kept in the filesystem's namespace to support the directory hierarchy. The content handle points to a super segment 1324 which holds a reference to a top of a segment tree 1327 of the file. The super segment points to a top reference 1330 that points 1333 to metadata 1336 and data segments 1339.

Thus, in a specific embodiment, each file in the filesystem may be represented by a tree. The tree includes a set of segment levels arranged into a hierarchy (e.g., parent-child). Each upper level of the tree includes one or more pointers or references to a lower level of the tree. A last upper level of the tree points to the actual data segments. Thus, upper level segments store metadata while the lowest level segments are the actual data segments. In an embodiment, a segment in an upper level includes a fingerprint (e.g., metadata) of fingerprints of one or more segments in a next lower level (e.g., child level) that the upper level segment references.

A tree may have any number of levels. The number of levels may depend on factors such as the expected size of files that are to be stored, desired deduplication ratio, available resources, overhead, and so forth. In a specific embodiment, there are seven levels L6 to L0. L6 refers to the top level. L6 may be referred to as a root level. L0 refers to the lowest level. Thus, the upper segment levels (from L6 to L1) are the metadata segments and may be referred to as LPs. That is, the L6 to L1 segments include metadata of their respective child segments. The lowest level segments are the data segments and may be referred to as L0s or leaf nodes. In an embodiment, segments in the filesystem are identified by 24 byte keys (or the fingerprint of a segment), including the LP segments. Each LP segment contains references to lower level LP segments.

Figure 14:
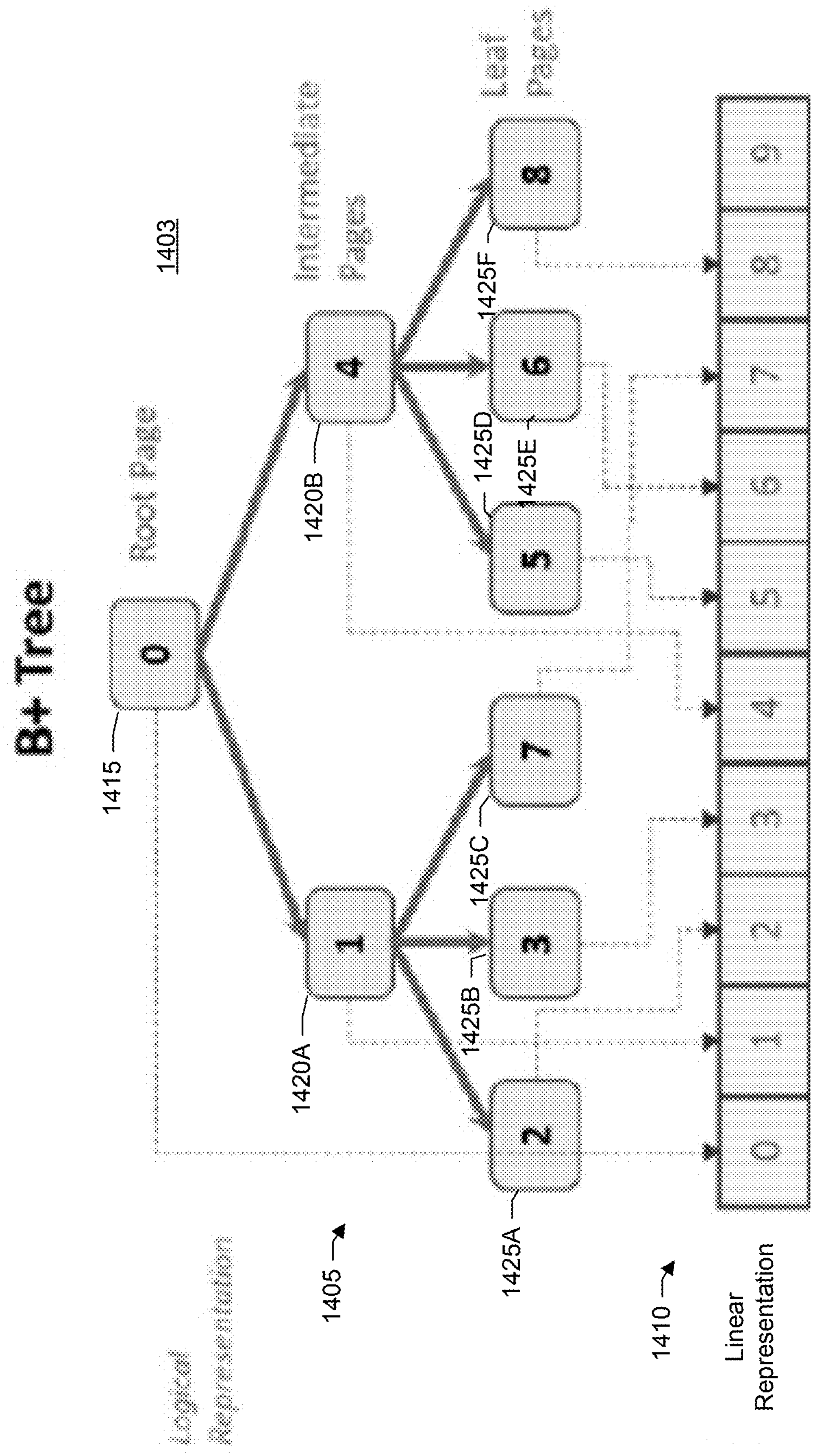
FIG. 14 shows an example of a tree data structure of the namespace, according to one or more embodiments.

FIG. 14 shows further detail of a namespace of the filesystem. In an embodiment, the namespace is represented by a B+ tree data structure where pages of the tree are written to a key-value store. Page identifiers form the keys of the key-value store and page content form the values of the key-value store. The tree data structure includes the folder and file structure as well as file inodes. FIG. 14 shows an example of a B+ Tree 1403 in a logical representation 1405 and a linear representation 1410. In this example, there is a root page 1415, intermediate pages 1420A,B, and leaf pages 1425A-F. The broken lines shown in FIG. 14 map the pages from their logical representation in the tree to their representation as a linear sequential set of pages on disk, e.g., flattened on-disk layout. In other words, the tree may be represented as a line of pages of data.

The intermediate pages store lookup keys that reference other intermediate or leaf pages. An intermediate page may be referred to as an INT page and references other INT pages or leaf pages by interior keys.

The leaf page contains "key/value" pairs. In an embodiment, a B+ Tree key is a 128-bit number kept in sorted order on the page. It is accompanied by a "value," which is an index to data associated with that key and may be referred to as a "payload." In an embodiment, the 128-bit key includes a 64-bit PID, or parent file ID (the ID of the directory that owns this item), and a 64-bit CID, or child file ID. In an embodiment, the leaf page stores a key for each file in the filesystem. The key references a payload identifying an inode number of the file and thus a pointer to content or data of the file. There can be another key for each file that identifies a name of the file.

Figure 15:
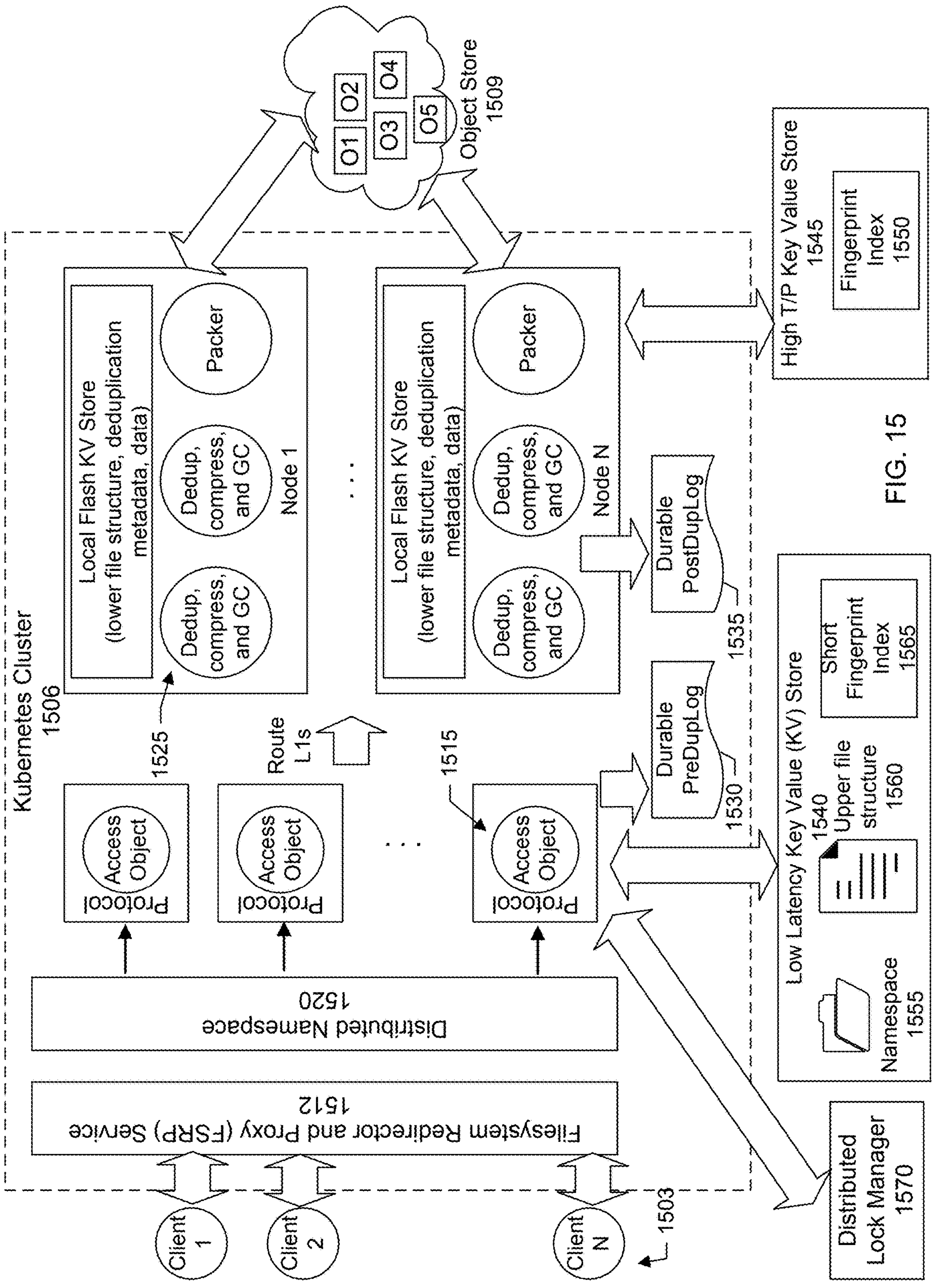
FIG. 15 shows an architecture of the deduplication and distributed filesystem, according to one or more embodiments.

FIG. 15 shows an example of an architecture of the scale-out data protection appliance, according to one or more embodiments. The example shown in FIG. 15 includes a set of clients 1503, a cluster 1506 at which a deduplicated filesystem is hosted across nodes of the cluster, and an object store 1509 storing file data segments that have been packed into objects. As discussed, in an embodiment, the cluster is a Kubernetes cluster where the filesystem is provided as a set of microservices. Application containerization is an operating system level virtualization method for deploying and running distributed applications without launching an entire VM for each application. Instead, multiple isolated systems are run on a single control host and access a single kernel. The application containers hold the components such as files, environment variables and libraries necessary to run the desired software to place less strain on the overall resources available. Containerization technology involves encapsulating an application in a container with its own operating environment, and a Docker program can deploy containers as portable, self-sufficient structures that can run on everything from physical computers to VMs, bare-metal servers, cloud clusters, and so forth. The Kubernetes system manages containerized applications in a clustered environment to help manage related, distributed components across varied infrastructures. Certain applications, such as multi-tenant shared databases running in a Kubernetes cluster, spread data over many volumes that are accessed by multiple cluster nodes in parallel.

The cluster includes FSRP 1512 and a set of nodes hosting a set of AOBs 1515 across which a namespace 1520 is distributed. Data is spread across multiple storage devices as may be provided in a cluster of nodes.

Nodes perform tasks that are controlled and scheduled by software. The nodes and other components of the system may communicate with each other over the network via messages and based on the message content, they perform certain acts such as reading data from the disk into memory, writing data stored in memory to the disk, performing computation (CPU), sending another network message to the same or a different set of components, and so forth. These acts, also called component actions, when executed in time order (by the associated component) in a distributed system would constitute a distributed operation. The scale out appliance may include any practical number of nodes. Nodes may include installed agents, services, or other resources to process the data.

The filesystem is shared by being simultaneously mounted on multiple servers. The file system can present a global namespace to clients or node sin a cluster accessing the data so that files appear to be in the same central location. In an embodiment, the file system stores the file system metadata on a distributed key value store and the file data on object store. The file/namespace metadata can be accessed by any AOB node, and any file can be opened for read/write by any AOB node. As discussed, in an embodiment, distributed key value stores are used to hold much of the metadata such as the namespace Btree, the Lp tree, fingerprint index, and container fingerprints. These run as containers within the cluster and may be stored to low latency media such as NVMe. There can also be a distributed and durable log that replaces NVRAM.

In particular, AOBs may handle namespace operations, file access requests, file creation, folder creation, file reads, and file writes. AOBs are responsible for operations involving upper levels of the tree data structures representing the files.

There is another set of nodes hosting other services 1525 that handle lower levels of the tree or file structures, such as the L1-L0 segments. Such services may include services for deduplication, compression, garbage collection, and packing of file segments into objects for storage in the object store. The AOBs route the lower level segments including L1s to these other backend services for further processing, e.g., deduplication, compression, and packing.

Operations and activities of the services may be recorded in a log. There can be a durable pre-deduplication log 1530 used by the AOBs and a durable post-deduplication log 1535 used by the backend services. The logs can be used to allow operations to resume following an interruption of a particular service instance.

A key value store may be used to store metadata of the filesystem. There can be a low latency key value store 1540 used by the AOBs and a high throughput key value store 1545 used by the backend deduplication, compression, garbage collection, and packing services. The high throughput key value store stores a fingerprint index 1550. The low latency key value store stores a namespace 1555, upper file structure (e.g., upper segment tree levels) 1560, and a short fingerprint index 1565.

There can be a distributed lock manager 1570 to coordinate file and folder updates by the AOBs to the Btree structure holding the namespace. When an AOB needs to make an update, the AOB acquires from the distributed lock manager a lock on one or more pages of the tree structure and makes the updates.

The filesystem supports multiple network protocols for accessing the data stored and managed by the filesystem. Such protocols include Data Domain Boost ("Boost" or "DDBoost"), Network Filesystem (NFS), and Amazon Simple Storage Service (S3), among others. DDBoost is a system that distributes parts of a deduplication process to the application clients, enabling client-side deduplication for faster, more efficient backup and recovery.

In an embodiment, the clients use the DDBoost backup protocol to conduct backups of client data to the storage system, restore the backups from the storage system to the clients, or perform other data protection operations. A DDBoost client library exposes application programming interfaces (APIs) to integrate with the storage system. These API interfaces exported by the DDBoost library provide mechanisms to access or manipulate the functionality of the Data Domain filesystem, as provided by Dell Technologies. Embodiments may utilize the DDBoost Filesystem Plug-In (BoostFS), which resides on the client application system and presents a standard filesystem mount point to the application. With direct access to a BoostFS mount point, the application can leverage the storage and network efficiencies of the DDBoost protocol for backup and recovery. Some embodiments are described in conjunction with the DDBoost protocol, PowerProtect Backup Appliance, and Data Domain filesystem as provided by Dell Technologies. It should be appreciated, however, that principles and aspects discussed can be applied to other filesystems, filesystem protocols, and backup storage systems.

In an embodiment, the data protection system is built on a Kubernetes PaaS (Platform as a Service). The filesystem redirection proxy (FSRP) is a service which is the entry point for a data-path. At the start of backup/restore operations, the clients (e.g., Boost clients) talk with the FSRP service to obtain an Internet protocol (IP) address identifying an access object service to handle the requested operation. FSRP returns an IP address of a particular access object service to the requesting client. The client can then connect directly to the particular access object service to complete the processing of their requested operation. The subsequent direct connection between the client and particular access object service, thereby bypassing FSRP, can result in FSRP not being acutely aware of how busy or loaded the particular access object service is. A further discussion of FSRP is provided in U.S. patent application Ser. No. 18/428,717, filed Jan. 31, 2024, which is incorporated by reference along with all other references cited.

Referring back now to FIG. 1, the clients may include servers, desktop computers, laptops, tablets, smartphones, internet of things (IoT) devices, or combinations of these. The network may be a cloud network, local area network (LAN), wide area network (WAN) or other appropriate network. The network provides connectivity to the various systems, components, and resources of the system, and may be implemented using protocols such as Transmission Control Protocol (TCP) and/or Internet Protocol (IP), well-known in the relevant arts. In a distributed network environment, the network may represent a cloud-based network environment in which applications, servers and data are maintained and provided through a centralized cloud computing platform. In an embodiment, the system may represent a multi-tenant network in which a server computer runs a single instance of a program serving multiple clients (tenants) in which the program is designed to virtually partition its data so that each client works with its own customized virtual application, with each virtual machine (VM) representing virtual clients that may be supported by one or more servers within each VM, or other type of centralized network server.

The storage system may include storage servers, clusters of storage servers, network storage device, storage device arrays, storage subsystems including RAID (Redundant Array of Independent Disks) components, a storage area network (SAN), Network-attached Storage (NAS), or Direct-attached Storage (DAS) that make use of large-scale network accessible storage devices, such as large capacity tape or drive (optical or magnetic) arrays, shared storage pool, or an object or cloud storage service. In an embodiment, storage (e.g., tape or disk array) may represent any practical storage device or set of devices, such as tape libraries, virtual tape libraries (VTL), fiber-channel (FC) storage area network devices, and OST (OpenStorage) devices. The storage may include any number of storage arrays having any number of disk arrays organized into logical unit numbers (LUNs). A LUN is a number or other identifier used to identify a logical storage unit. A disk may be configured as a single LUN or may include multiple disks. A LUN may include a portion of a disk, portions of multiple disks, or multiple complete disks. Thus, storage may represent logical storage that includes any number of physical storage devices connected to form a logical storage.

In an embodiment, the clients may be referred to as backup clients. In this embodiment, the filesystem provides a backup target for data generated by the clients. The backups are secondary copies that can be used in the event that primary file copies on the clients become unavailable due to, for example, data corruption, accidental deletion, natural disaster, data breaches, hacks, or other data loss event. The backups may be stored in a format such as a compressed format, deduplicated format, or encrypted format that is different from the native source format. In an embodiment, the filesystem is hosted by a cluster of nodes (e.g., two or more nodes). Depending on demand, cluster nodes or services may be dynamically scaled up or down. Thus, the cluster may be referred to as a scale out cluster. For example, as part of on-going operations, new nodes or new instances of a service may be added to the cluster or existing nodes or instances of a service may be removed from the cluster.

Figure 16:
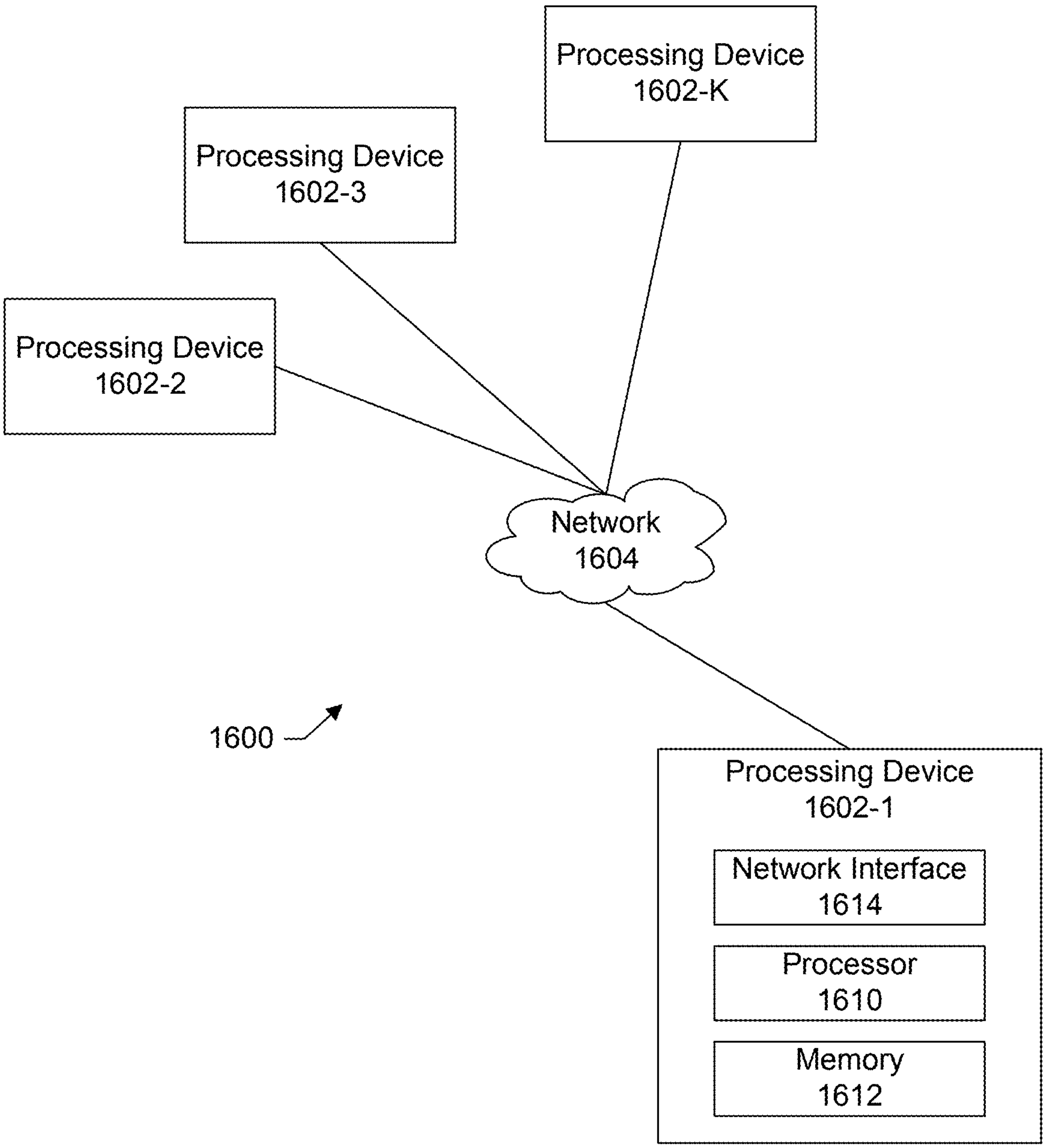
FIG. 16 shows a block diagram of a processing platform that may be utilized to implement at least a portion of an information processing system, according to one or more embodiments.

FIG. 16 shows an example of a processing platform 1600 that may include at least a portion of the information handling system shown in FIG. 1. The example shown in FIG. 16 includes a plurality of processing devices, denoted 1602-1, 1602-2, 1602-3, . . . 1602-K, which communicate with one another over a network 1604.

The network 1604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1602-1 in the processing platform 1600 comprises a processor 1610 coupled to a memory 1612.

The processor 1610 may comprise a microprocessor, a microcontroller, an application-specific integrated circuit (ASIC), a field-programmable gate array (FPGA) or other type of processing circuitry, as well as portions or combinations of such circuitry elements.

The memory 1612 may comprise random access memory (RAM), read-only memory (ROM) or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and the information handling system may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 100 are illustratively implemented in the form of software running on one or more processing devices.

Figure 17:
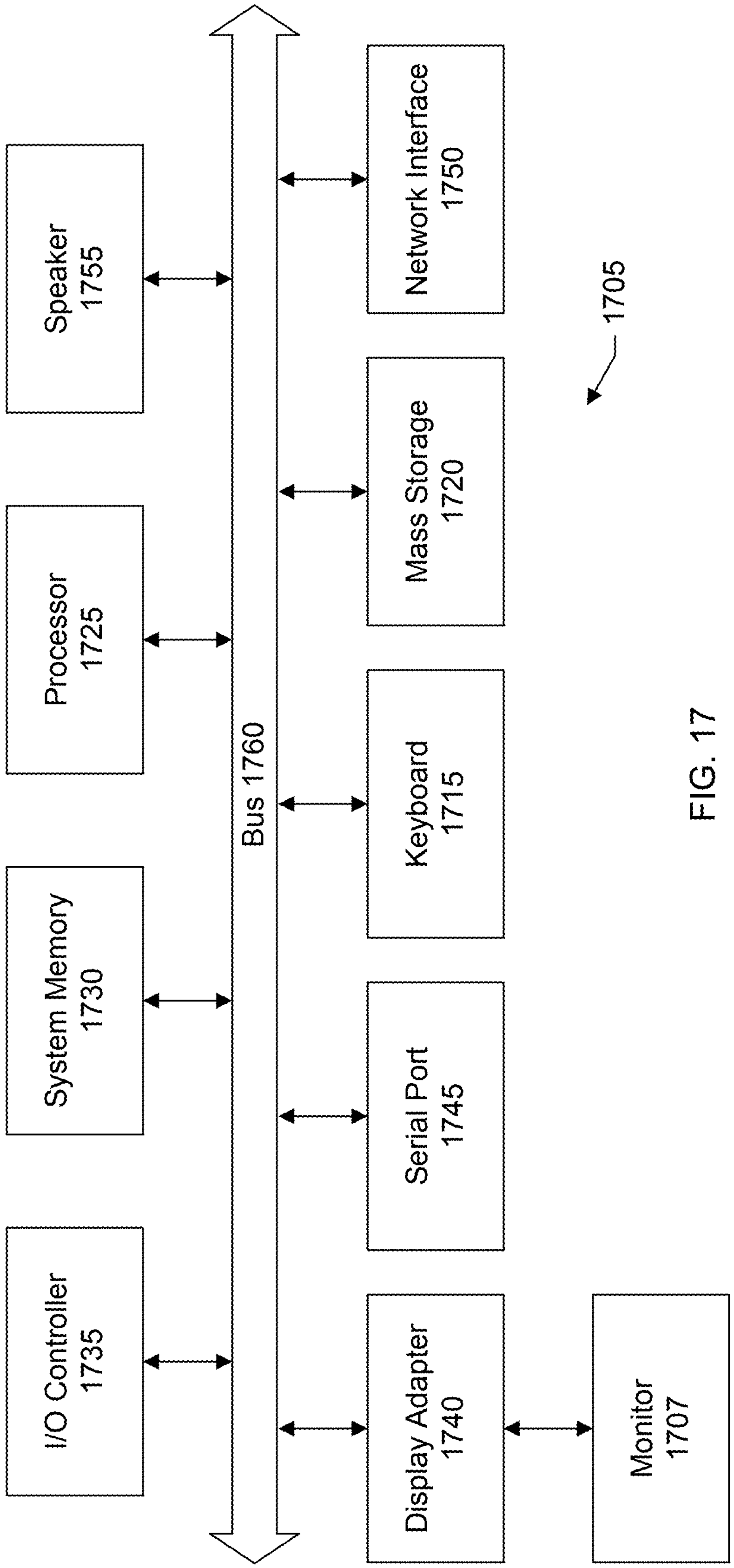
FIG. 17 shows a block diagram of a computer system suitable for use with the system, according to one or more embodiments.

FIG. 17 shows a system block diagram of a computer system 1705 used to execute the software of the present system described herein. The computer system includes a monitor 1707, keyboard 1715, and mass storage devices 1720. Computer system 1705 further includes subsystems such as central processor 1725, system memory 1730, input/output (I/O) controller 1735, display adapter 1740, serial or universal serial bus (USB) port 1745, network interface 1750, and speaker 1755. The system may also be used with computer systems with additional or fewer subsystems. For example, a computer system could include more than one processor 1725 (i.e., a multiprocessor system) or a system may include a cache memory.

Arrows such as 1760 represent the system bus architecture of computer system 1705. However, these arrows are illustrative of any interconnection scheme serving to link the subsystems. For example, speaker 1755 could be connected to the other subsystems through a port or have an internal direct connection to central processor 1725. The processor may include multiple processors or a multicore processor, which may permit parallel processing of information. Computer system 1705 shown in FIG. 17 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®, family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method comprising:

creating a Network File System (NFS) export on a node of a data protection appliance, the NFS export comprising a backup to be accessed by an access object (AOB) service hosted by the node, the node being part of a cluster of nodes comprising other AOB services and NFSv3 servers accessible via external Internet Protocol (IP) addresses, and the AOB services being responsible for handling different portions of a deduplication filesystem of the appliance within which backups are organized, each AOB service still having access to other portions of the filesystem assigned to other AOB services;

mounting the NFS export at an NFSv3 client;

allowing the NFSv3 client to conduct data protection input/output (IO) on the NFS export using an external IP address associated with the node;

maintaining a mapping of the NFS export and the external IP address associated with the node;

upon a failure of the node, probing resource utilization of other available nodes in the cluster to select a failover node;

consulting the mapping to identify the external IP address associated with the failed node; and migrating the external IP address from the failed node to the failover node, thereby allowing requests for the data protection IO on the NFS export by the NFSv3 client to continue using the external IP address previously associated with the failed node, wherein the probing resource utilization comprises:

fetching a plurality of resource utilization metrics associated with the other available nodes, the plurality of resource utilization metrics comprising a first resource utilization metric indicating a count of streams being handled by an available node, a second resource utilization metric indicating CPU, memory, network, and disk being consumed by the available node, a third resource utilization metric indicating a number of connection requests being handled by the available node, a fourth resource utilization metric indicating workload being handled by the available node, a fifth resource utilization metric indicating historical workloads previously handled by the available node, and a sixth resource utilization metric indicating whether the available node is currently serving as a failover node for a different failed node;

comparing the plurality of resource utilization metrics to corresponding thresholds;

setting weights on the available nodes based on the comparison; and evaluating the weights set on the available nodes to identify an available node that should serve as the failover node.

2. The method of claim 1 further comprising storing the mapping in a ConfigMap object.

3. The method of claim 1 further comprising storing the mapping in a global registry.

4. The method of claim 1 further comprising:

upon a recovery of the failed node, migrating the external IP address from the failover node back to the now recovered node.

5. The method of claim 1 wherein the backup comprises a backup image of a virtual machine backed up from a production data store to the data protection appliance and the method further comprises:

booting the virtual machine from the data protection appliance.

6. A system comprising: a processor; and memory configured to store one or more sequences of instructions which, when executed by the processor, cause the processor to carry out the steps of:

creating a Network File System (NFS) export on a node of a data protection appliance, the NFS export comprising a backup to be accessed by an access object (AOB) service hosted by the node, the node being part of a cluster of nodes comprising other AOB services and NFSv3 servers accessible via external Internet Protocol (IP) addresses, and the AOB services being responsible for handling different portions of a deduplication filesystem of the appliance within which backups are organized, each AOB service still having access to other portions of the filesystem assigned to other AOB services;

mounting the NFS export at an NFSv3 client;

allowing the NFSv3 client to conduct data protection input/output (IO) on the NFS export using an external IP address associated with the node;

maintaining a mapping of the NFS export and the external IP address associated with the node;

upon a failure of the node, probing resource utilization of other available nodes in the cluster to select a failover node;

consulting the mapping to identify the external IP address associated with the failed node; and migrating the external IP address from the failed node to the failover node, thereby allowing requests for the data protection IO on the NFS export by the NFSv3 client to continue using the external IP address previously associated with the failed node, wherein the probing resource utilization comprises:

fetching a plurality of resource utilization metrics associated with the other available nodes, the plurality of resource utilization metrics comprising a first resource utilization metric indicating a count of streams being handled by an available node, a second resource utilization metric indicating CPU, memory, network, and disk being consumed by the available node, a third resource utilization metric indicating a number of connection requests being handled by the available node, a fourth resource utilization metric indicating workload being handled by the available node, a fifth resource utilization metric indicating historical workloads previously handled by the available node, and a sixth resource utilization metric indicating whether the available node is currently serving as a failover node for a different failed node;

comparing the plurality of resource utilization metrics to corresponding thresholds;

setting weights on the available nodes based on the comparison; and evaluating the weights set on the available nodes to identify an available node that should serve as the failover node.

7. The system of claim 6 wherein the processor further carries out the step of storing the mapping in a ConfigMap object.

8. The system of claim 6 wherein the processor further carries out the step of storing the mapping in a global registry.

9. The system of claim 6 wherein the processor further carries out the step of:

upon a recovery of the failed node, migrating the external IP address from the failover node back to the now recovered node.

10. The system of claim 6 wherein the backup comprises a backup image of a virtual machine backed up from a production data store to the data protection appliance and the processor further carries out the step of:

booting the virtual machine from the data protection appliance.

11. A computer program product, comprising a non-transitory computer-readable medium having a computer-readable program code embodied therein, the computer-readable program code adapted to be executed by one or more processors to implement a method comprising:

creating a Network File System (NFS) export on a node of a data protection appliance, the NFS export comprising a backup to be accessed by an access object (AOB) service hosted by the node, the node being part of a cluster of nodes comprising other AOB services and NFSv3 servers accessible via external Internet Protocol (IP) addresses, and the AOB services being responsible for handling different portions of a deduplication filesystem of the appliance within which backups are organized, each AOB service still having access to other portions of the filesystem assigned to other AOB services;

mounting the NFS export at an NFSv3 client;

allowing the NFSv3 client to conduct data protection input/output (IO) on the NFS export using an external IP address associated with the node;

maintaining a mapping of the NFS export and the external IP address associated with the node;

upon a failure of the node, probing resource utilization of other available nodes in the cluster to select a failover node;

consulting the mapping to identify the external IP address associated with the failed node; and migrating the external IP address from the failed node to the failover node, thereby allowing requests for the data protection IO on the NFS export by the NFSv3 client to continue using the external IP address previously associated with the failed node, wherein the probing resource utilization comprises:

fetching a plurality of resource utilization metrics associated with the other available nodes, the plurality of resource utilization metrics comprising a first resource utilization metric indicating a count of streams being handled by an available node, a second resource utilization metric indicating CPU, memory, network, and disk being consumed by the available node, a third resource utilization metric indicating a number of connection requests being handled by the available node, a fourth resource utilization metric indicating workload being handled by the available node, a fifth resource utilization metric indicating historical workloads previously handled by the available node, and a sixth resource utilization metric indicating whether the available node is currently serving as a failover node for a different failed node;

comparing the plurality of resource utilization metrics to corresponding thresholds;

setting weights on the available nodes based on the comparison; and evaluating the weights set on the available nodes to identify an available node that should serve as the failover node.

12. The computer program product of claim 11 wherein the method further comprises storing the mapping in a ConfigMap object.

13. The computer program product of claim 11 wherein the method further comprises storing the mapping in a global registry.

14. The computer program product of claim 11 wherein the method further comprises:

upon a recovery of the failed node, migrating the external IP address from the failover node back to the now recovered node.

15. The computer program product of claim 11 wherein the backup comprises a backup image of a virtual machine backed up from a production data store to the data protection appliance and the method further comprises:

booting the virtual machine from the data protection appliance.

* * * * *